US012661290B2

(12) United States Patent
Siedlecki et al.

(10) Patent No.: US 12,661,290 B2
(45) Date of Patent: Jun. 23, 2026

(54) INTEGRATED PATIENT LIFT AND TRANSFER SYSTEM

(71) Applicant: Integrated Transfer Solutions, Inc., Nashville, TN (US)

(72) Inventors: John A. Siedlecki, Nashville, TN (US); Cameron Stenhouse, Nashville, TN (US); Kevin Rotert, Nashville, TN (US)

(73) Assignee: Integrated Transfer Solutions, Inc., Nashville, TN (US)

( * ) Notice: Subject to any disclaimer, the term of this patent is extended or adjusted under 35 U.S.C. 154(b) by 0 days.

(21) Appl. No.: 19/183,245

(22) Filed: Apr. 18, 2025

(65) Prior Publication Data

US 2025/0325427 A1 Oct. 23, 2025

Related U.S. Application Data

(60) Provisional application No. 63/635,996, filed on Apr. 18, 2024.

(51) Int. Cl.
*A61G 7/10* (2006.01)
*A61G 7/16* (2006.01)

(52) U.S. Cl.
CPC ......... *A61G 7/1017* (2013.01); *A61G 7/1007* (2013.01); *A61G 7/1032* (2013.01);
(Continued)

(58) Field of Classification Search
CPC .... A61G 7/1019; A61G 7/1046; A61G 7/015; A61G 7/1057; A61G 5/006;
(Continued)

(56) References Cited

U.S. PATENT DOCUMENTS 5,255,934 A * 10/1993 Wilson ................. A61G 7/1019 4/480
5,380,034 A * 1/1995 Wilson ................... A61G 7/053 297/29

(Continued)

FOREIGN PATENT DOCUMENTS

CN 109363837 A 2/2019
CN 209966800 U 1/2020

(Continued)

OTHER PUBLICATIONS

Notification of Transmittal of the Int'l. Search Report and the Written Opinion of the Int'l. Searching Authority, PCT/US2025/025421, Jun. 13, 2025, ISA/US.

*Primary Examiner* — Madison Matthews
(74) *Attorney, Agent, or Firm* — FBT Gibbons LLP; Alexander J. Johnson

(57) ABSTRACT

An integrated patient lift and transfer system comprising a bed plate, a mover base, and a lift. The bed plate is placeable on a bed and including a seat rest and a back rest pivotably attached to the seat rest. The bed plate is configurable to a planar configuration where the back rest and seat rest are co-planar and to a seated configuration where the back rest and seat rest are not co-planar. The mover base including one or more wheels and configured to removably attach to the bed plate. The lift including one or more transfer arms and one or more tilt arms. The one or more transfer arms and one or more tilt arms configured to removably attach to the bed plate and tilt the bed plate from the planar configuration to the seated configuration and to transfer the bed plate from the bed to the mover base.

18 Claims, 31 Drawing Sheets

(52) U.S. Cl.
CPC ......... *A61G 7/1046* (2013.01); *A61G 7/1088* (2013.01); *A61G 7/109* (2013.01); *A61G 7/16* (2013.01); *A61G 2203/30* (2013.01); *A61G 2203/70* (2013.01)

(58) Field of Classification Search
CPC ................ A61G 7/1059; A61G 5/1002; A61G 2203/40; A61G 7/16; A61G 7/1076; A61G 7/1036; A61G 5/1059; A61G 2203/80; A61G 7/1017; A61G 7/1007; A61G 7/1032; A61G 7/1088; A61G 7/109; A61G 2203/30; A61G 2203/70; A61G 2200/32; A61G 2200/34; A61G 7/103; A61G 7/00; A61G 7/02; A61G 5/14; A61G 7/08; Y10S 297/04; Y10S 180/907; Y10S 414/134
USPC ........ 5/83.1, 87.1, 86.1, 607, 608, 610, 611, 5/84.1, 88.1, 89.1, 424, 618, 81.1 HS, 5/81.1 R; 280/657, 30, 304.1
See application file for complete search history.

(56) References Cited

U.S. PATENT DOCUMENTS

| | | | | |
|---|---|---|---|---|
| 6,427,263 | B1 * | 8/2002 | Lindell | A61G 7/1057 5/607 |
| 8,316,480 | B2 * | 11/2012 | Burak, Jr. | A61G 7/1057 5/81.1 HS |
| 8,336,133 | B2 * | 12/2012 | Palay | A61G 7/1017 5/81.1 R |
| 8,336,134 | B2 * | 12/2012 | Jelinek | A61G 7/1017 5/83.1 |
| 9,021,633 | B2 | 5/2015 | Chun et al. | |
| 10,835,430 | B2 | 11/2020 | Sweeney et al. | |
| 2009/0249544 | A1 * | 10/2009 | Palay | A61G 7/1036 5/89.1 |

FOREIGN PATENT DOCUMENTS

| | | | | |
|---|---|---|---|---|
| CN | 116712263 A | * | 9/2023 | A61G 7/015 |
| DE | 3615412 C2 | * | 8/1995 | A61G 7/1059 |
| KR | 101194388 B1 | * | 10/2012 | A61G 7/1076 |

* cited by examiner

INTEGRATED PATIENT LIFT AND TRANSFER SYSTEM

CROSS REFERENCE TO RELATED APPLICATIONS

This application claims the benefit of U.S. Provisional Patent Application No. 63/635,996, filed Apr. 18, 2024, which is hereby incorporated by reference in its entirety.

TECHNICAL FIELD

The present invention relates to systems for lifting and transferring patients from, for example, hospital, healthcare facility, or home beds to wheelchair-like devices to accommodate, for example, toileting and/or showering for patients with limited body strength, control, mobility, balance, and/or dexterity.

BACKGROUND

The Hoyer Lift system (as an example) is a well-known system for transferring patients from a hospital bed that lacks mechanisms to complete and reverse patient transfer from a bed to a toilet or shower seamlessly and without undue risk to healthcare personnel or home caregivers, as well as patients. However, using the Hoyer Lift is time-consuming and can require multiple healthcare personnel for use within a healthcare facility, or with home caregivers for home use, even for patients of lighter body weight. This device also requires multiple physical interventions by one or more healthcare personnel, or other home caregivers in the case of home use, to transfer a patient effectively and safely from the bed to the toilet or shower.

There is a continuing need for lift and transfer devices that are easy to use (even with patients that have less body strength, control, mobility, balance, and/or dexterity, etc.), are economical and provide a fully integrated transfer from a bed to a wheelchair-like device where the patient can move about to do their daily activities. While several patient handling devices and systems have been made and used, it is believed that no one prior to the inventors has made or used the invention described in the appended claims.

BRIEF DESCRIPTION OF THE DRAWINGS

While the specification concludes with claims which particularly point out and distinctly claim this technology, it is believed this technology may be better understood from the following description of certain examples taken in conjunction with the accompanying drawings, in which like reference numerals identify the same elements and in which:

Figure 1:
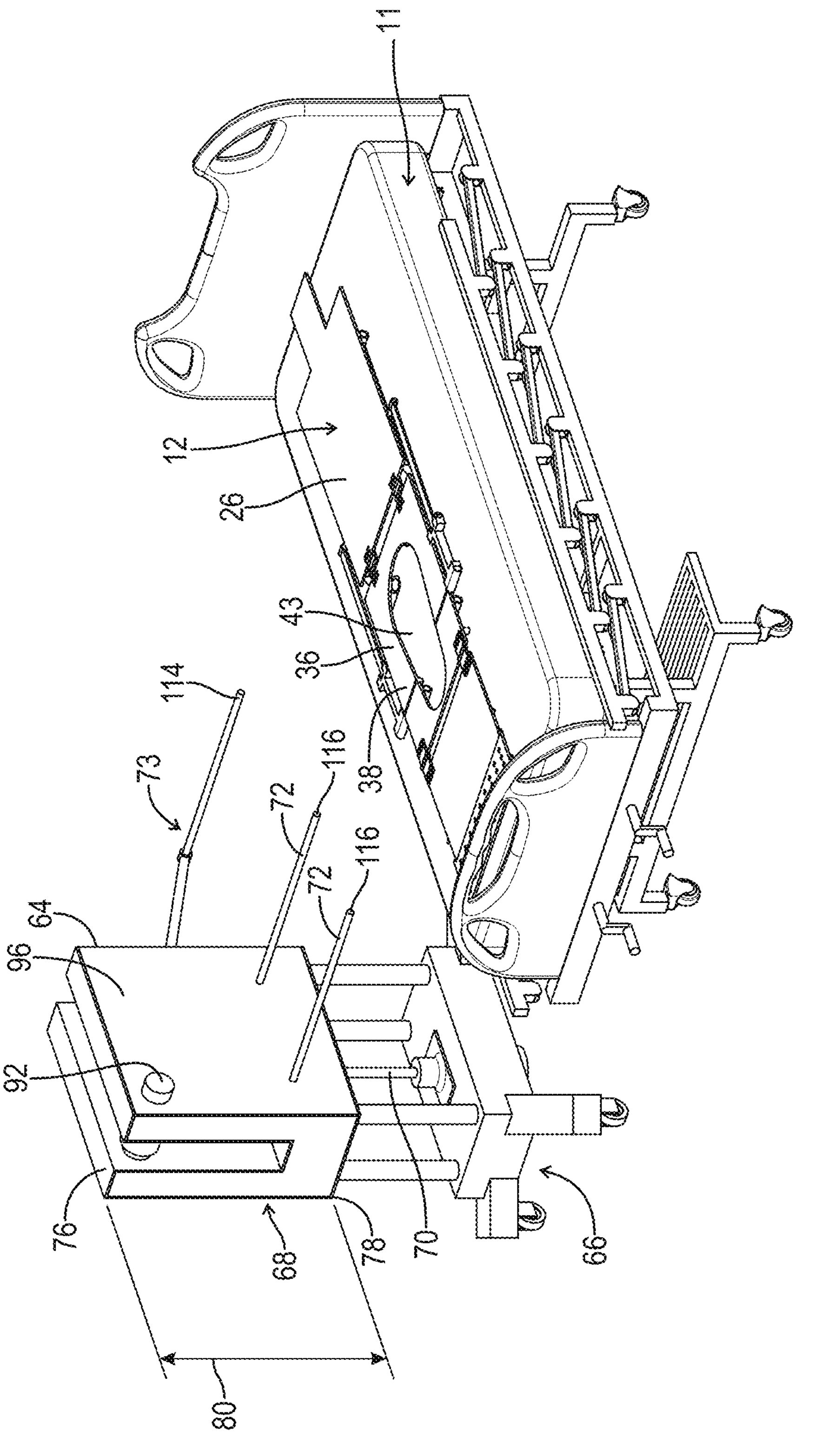
FIG. 1 illustrates a side perspective view of a lift and bed plate of an integrated patient lift and transfer system of one version of the present invention in which the lift may be located laterally relative to the bed plate and the bed plate may be located on a hospital bed and may be in a co-planar configuration.

The drawings are not intended to be limiting in any way, and it is contemplated that various versions of the technology may be carried out in a variety of other ways, including those not necessarily depicted in the drawings. The accompanying drawings incorporated in and forming a part of the specification illustrate several aspects of the present technology, and together with the description explain the principles of the technology; it being understood, however, that this technology is not limited to the precise arrangements shown.

DETAILED DESCRIPTION

The following description of certain examples of the technology should not be used to limit its scope. Other examples, features, aspects, versions, and advantages of the technology may become apparent to those skilled in the art from the following description, which is by way of illustration, one of the best modes contemplated for carrying out the technology. As may be realized, the technology described herein is capable of other different and obvious aspects, all without departing from the technology. Accordingly, the drawings and descriptions should be regarded as illustrative in nature and not restrictive.

It is further understood that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined may be readily apparent to those of ordinary skill in the art in view of the teachings herein. Such modifications and variations are intended to be included within the scope of the claims.

The system of the present disclosure provides a unique integrated, reversible system to complete lift and transfer from bed to, for example, toilet and/or shower, and back to bed (i.e., the system provides the solution in reverse). It may be important to note that some patients or people with certain diagnoses have less body strength, control, mobility, balance, and/or dexterity, etc., than patients without certain diagnoses, such as Cerebral Palsy, Multiple Sclerosis, Muscular Dystrophy, orthopedic, or neuro pathology. In such instances, the physical requirements of healthcare personnel, or other people for home use of devices such as or similar to the Hoyer Lift are amplified. The devices of the present disclosure may allow healthcare personnel and other operators to transfer such patients with relative ease.

Certain preferred versions are shown in FIGS. 1-41. It may be understood that variations of the apparatuses shown in the illustrations are possible. It may also be appreciated that any combination of features may be possible. FIGS. 1-41 are drawn to scale, but it may be appreciated that other dimensions are possible.

In one or more versions, the present disclosure may provide a patient lift and transfer system 10 that may be configured to transport a patient and that may include a bed plate 12, a lift 64, and a mover base 74. Bed plate 12 may be configured to rest on a bed 11 and may include a top 130 configured to face/receive the patient, a bottom 132 opposite top 130 and configured to face/rest on bed 11, a thickness 134 extending from top 130 to bottom 132, a first side 14, a second side 16 opposite first side 14, a width 18 extending from first side 14 to second side 16 and perpendicular to thickness 134. In one or more versions, thickness 134 may vary from top 130 to bottom 132, and in yet other versions, thickness 134 may be the same from top 130 to bottom 132. Bed plate 12 may also include a first end 20, a second end 22, a length 24 extending from first end 20 to second end 22 and perpendicular to width 18 and thickness 134. Bed plate 12 may also include a back rest 26 located adjacent (i.e., at or near) first end 20 and configurable to support a patient's back, a seat rest 36 located distal to and pivotably connectable to back rest 26 and comprising a top 38 configurable to lie directly below the patient's pelvis, a bottom 40 opposite top 38, and a toileting aperture 43 extending through seat rest 36 (from seat rest top 38 to seat rest bottom 40). Bed plate 12 may also include a leg rest 42 located distal to and pivotably connectable to seat rest 36 and configurable to support the patient's legs, a foot rest 52 located distal to and pivotably connectable to leg rest 42 and configurable to support the patient's feet, a first arm rest 54 that in one or more versions may be on the left side of bed plate 12, connected to back rest 26 and/or seat rest 36 and configurable to support an arm of the patient, such as the patient's left arm, a second arm rest 56 that in one or more versions may be on the right side of bed plate 12, connected to back rest 26 and/or seat rest 36 and configurable to support an arm of the patient, such as the patient's right arm, one or more transfer arm receptacles 58 (that may, e.g., extend across a width of bed plate 12 below seat rest 36) that may interact with one or more transfer arms 72 of lift 64, one or more tilt arm receptacle(s) 60 that may interact with one or more tilt arms 73 of lift 64, and/or one or more posts 90 that may interact with one or more post receptacles 62 of mover base 74.

Bed plate 12 may have a co-planar/bed-like configuration shown in FIGS. 1-4 in which the tops of back rest 26, seat rest 36, and leg rest 42 are co-planar (and wherein bed plate 12 may be configured to, e.g., support the patient in a supine position), and a seated/wheel-chair like configuration as shown in FIGS. 6-13 and 15, in which the tops of back rest 26, seat rest 36, and leg rest 42 are not co-planar (and wherein bed plate 12 may be configured to, e.g., support the patient in a seated position). For ease of reference, the words "top" and "bottom" are used herein to refer to bed plate 12 when it may be in the co-planar configuration and resting on bed 11.

In one or more versions, lift 64 may be configurable to removably attach to bed plate 12 (preferably when bed plate 12 may be in the seated configuration), and may include a base 66 optionally comprising wheels 118 such as, but not limited to, caster wheels, an upper section 68 located above base 66, and an upper section lift/moveable shaft/main piston 70 connecting base 66 to upper section 68 and configurable to raise and lower upper section 68 relative to base 66. Lift 64 may also include one or more transfer arms 72 extending laterally from upper section 68 and configurable to be removably received in one or more transfer arm receptacles 58 of bed plate 12, and optionally one or more tilt arms 73 connected to a pivot arm/actuator 120 and configurable to be removably received in tilt arm receptacle(s) 60 of bed plate 12 and configurable to tilt back rest 26 relative to the seat rest 36 of bed plate 12. Optionally, pivot arm actuator 120 may include a cylinder and piston rod. In one or more versions, the one or more transfer arms 72 and one or more tilt arms 73 may be removable from lift 64 which may allow for lift 64 to travel through doorways more easily. In one or more versions, the one or more transfer arms 72 and one or more tilt arms 73 may be securable to lift 64 through the use of hinges which may allow for the one or more transfer arms 72 and one or more tilt arms 73 to be folded up against lift 64 which may allow for lift 64 to travel through doorways more easily.

Figure 14:
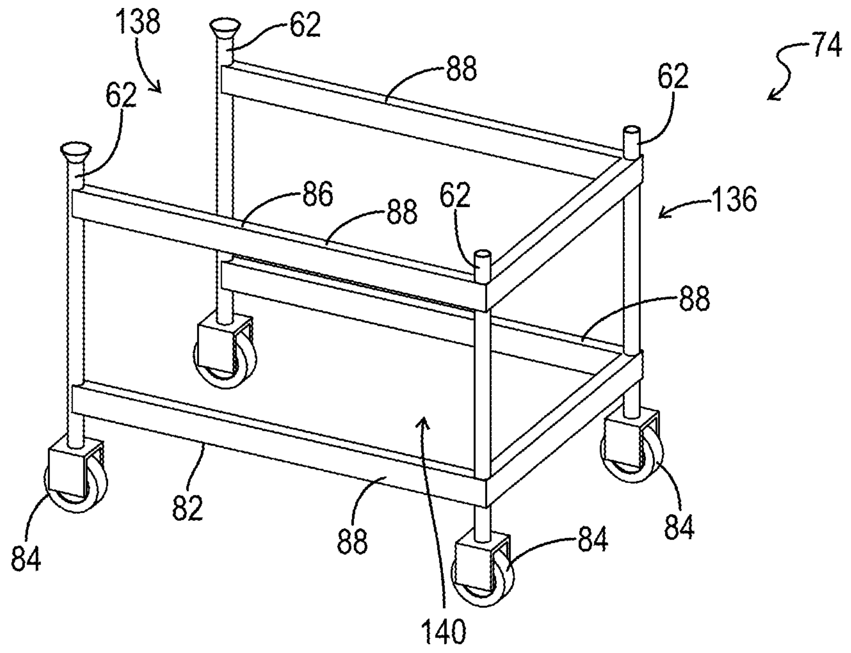
FIG. 14 illustrates a side perspective view of the mover base of FIG. 7.
Figure 15:
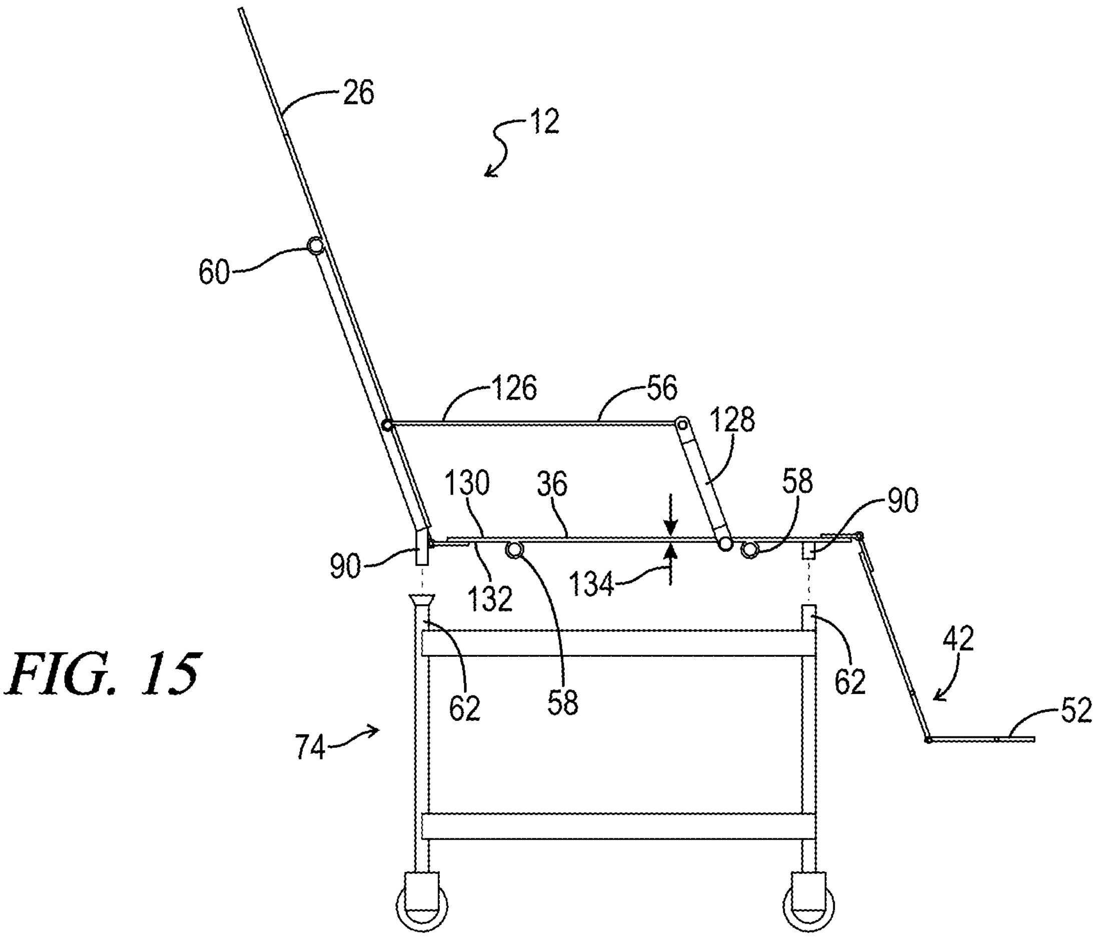
FIG. 15 illustrates a side elevation view of the mover base and bed plate of FIG. 7 prior to the bed plate being secured within the mover base.
Figure 16:
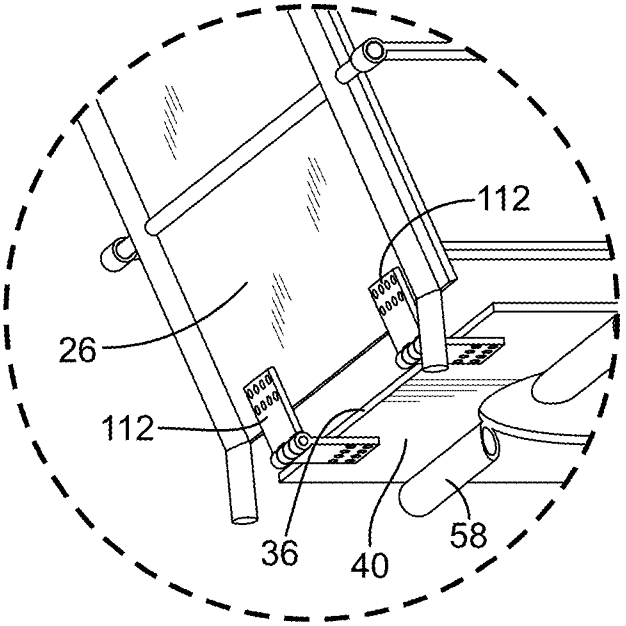
FIG. 16 illustrates a close-up perspective view of the circled area labelled 16 in FIG. 13.
Figure 17:
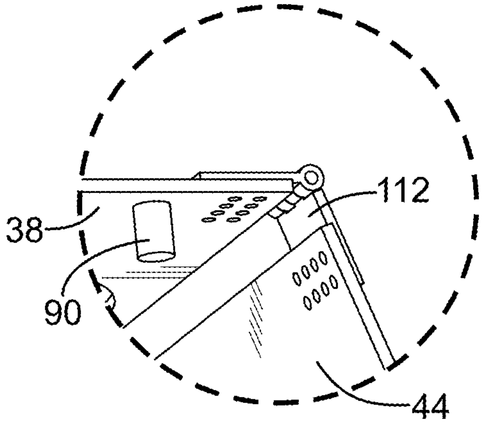
FIG. 17 illustrates a close-up perspective view of the circled area labelled 17 in FIG. 13.
Figure 34B:
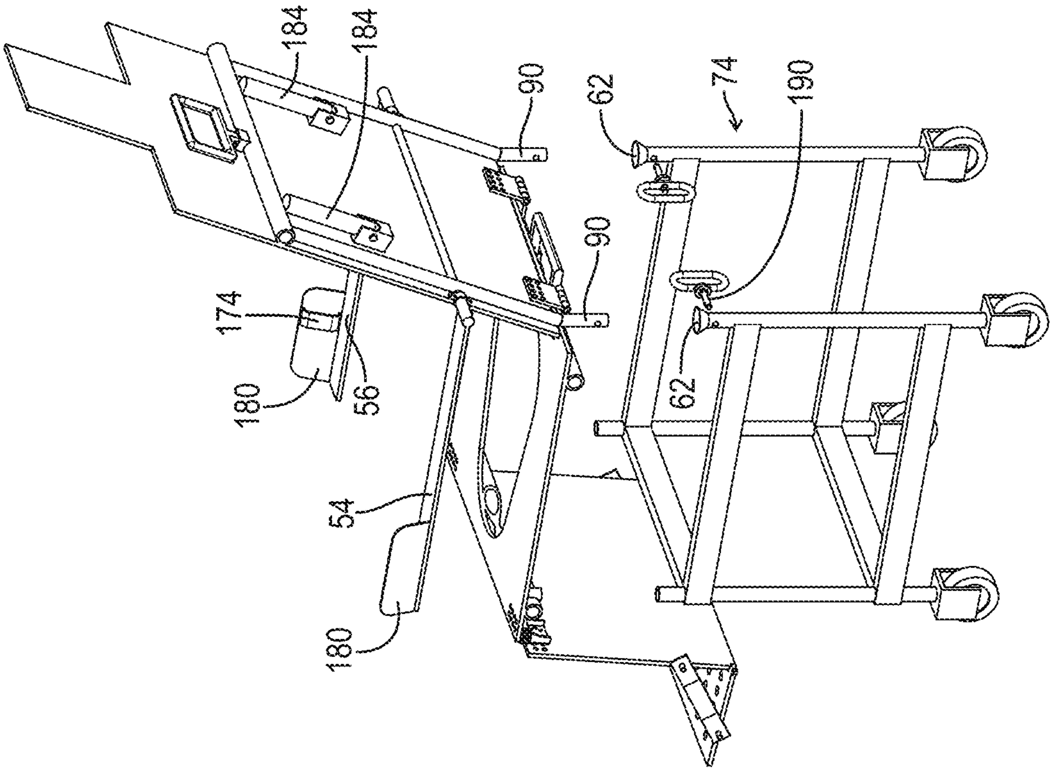
FIG. 34B illustrates a side perspective view of FIG. 34A with the bed plate in a position above the mover base prior to being secured thereto.
Figure 34A:
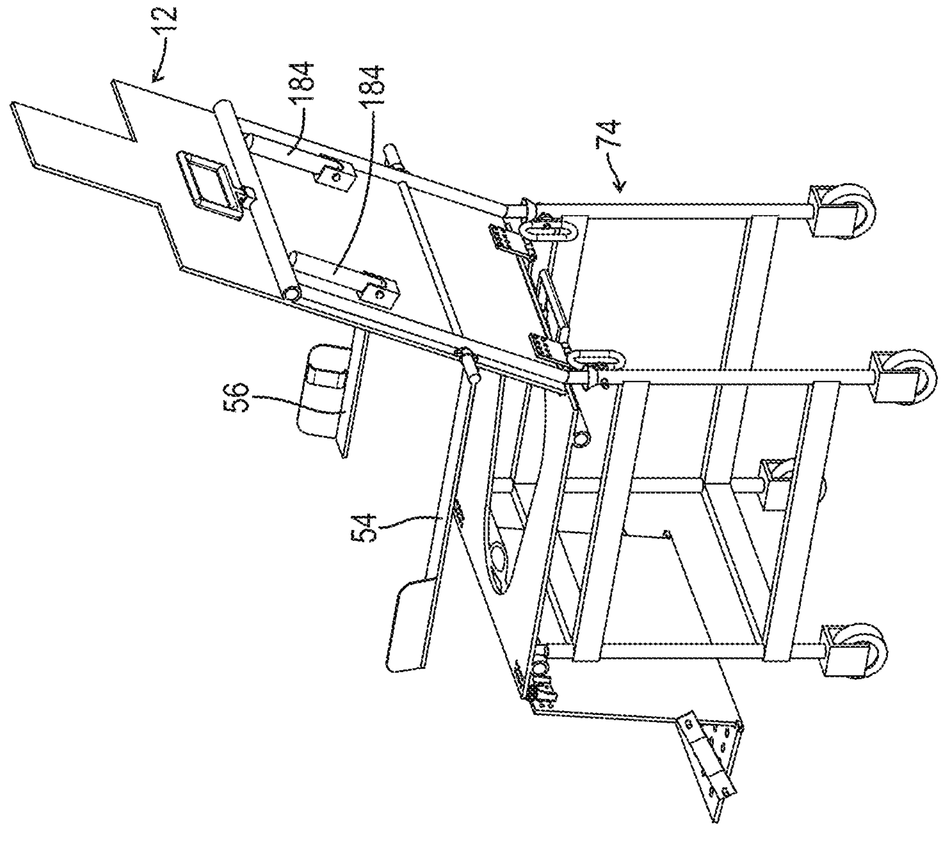
FIG. 34A illustrates a side perspective view of one version of a bed plate in a seated configuration secured on a mover base.
Figure 35B:
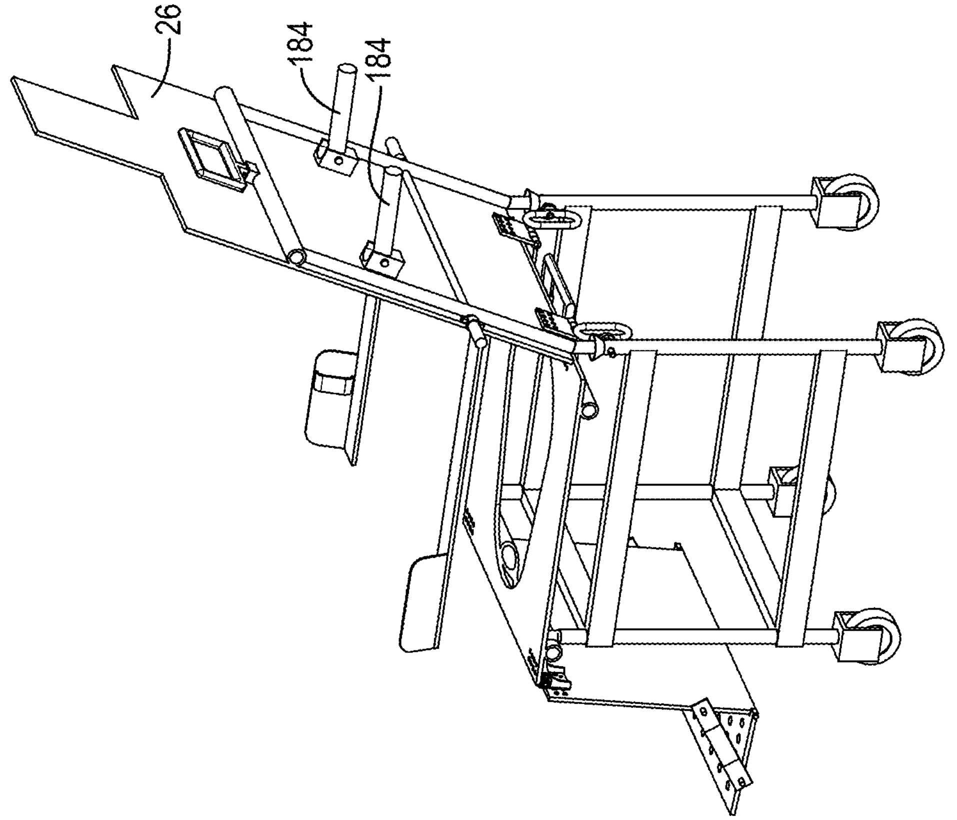
FIG. 35B illustrates a side perspective view of FIG. 35A with the handles in a position for use thereof.
Figure 35A:
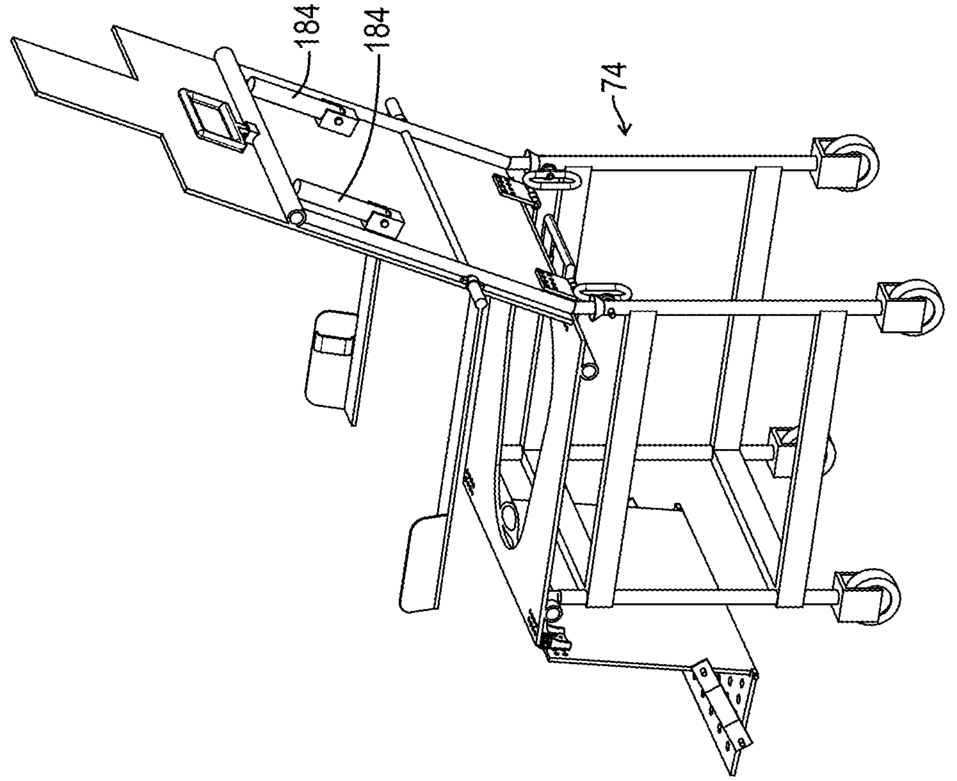
FIG. 35A illustrates a side perspective view of one version of a bed plate in a seated configuration on a mover base, wherein the bed plate includes handles that are stowed away.
Figure 38:
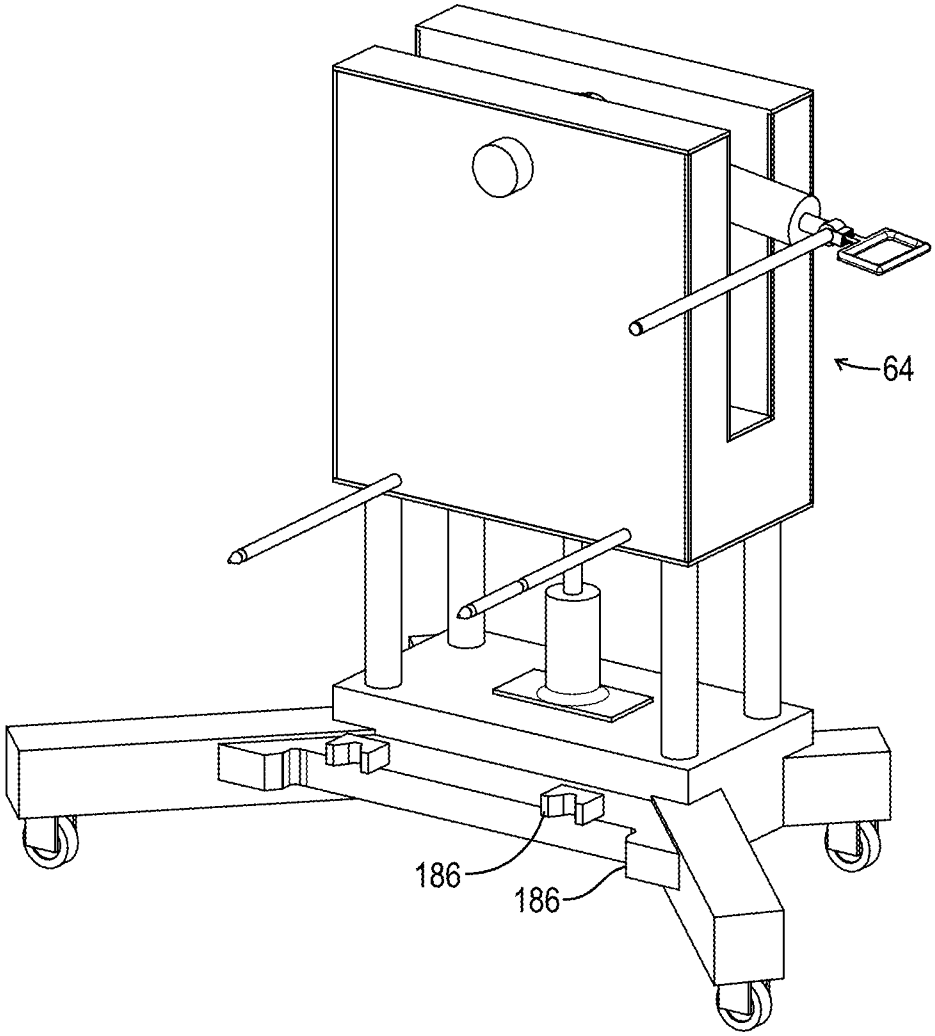
FIG. 38 illustrates a perspective view of a lift of a version of the present invention.
Figure 39:
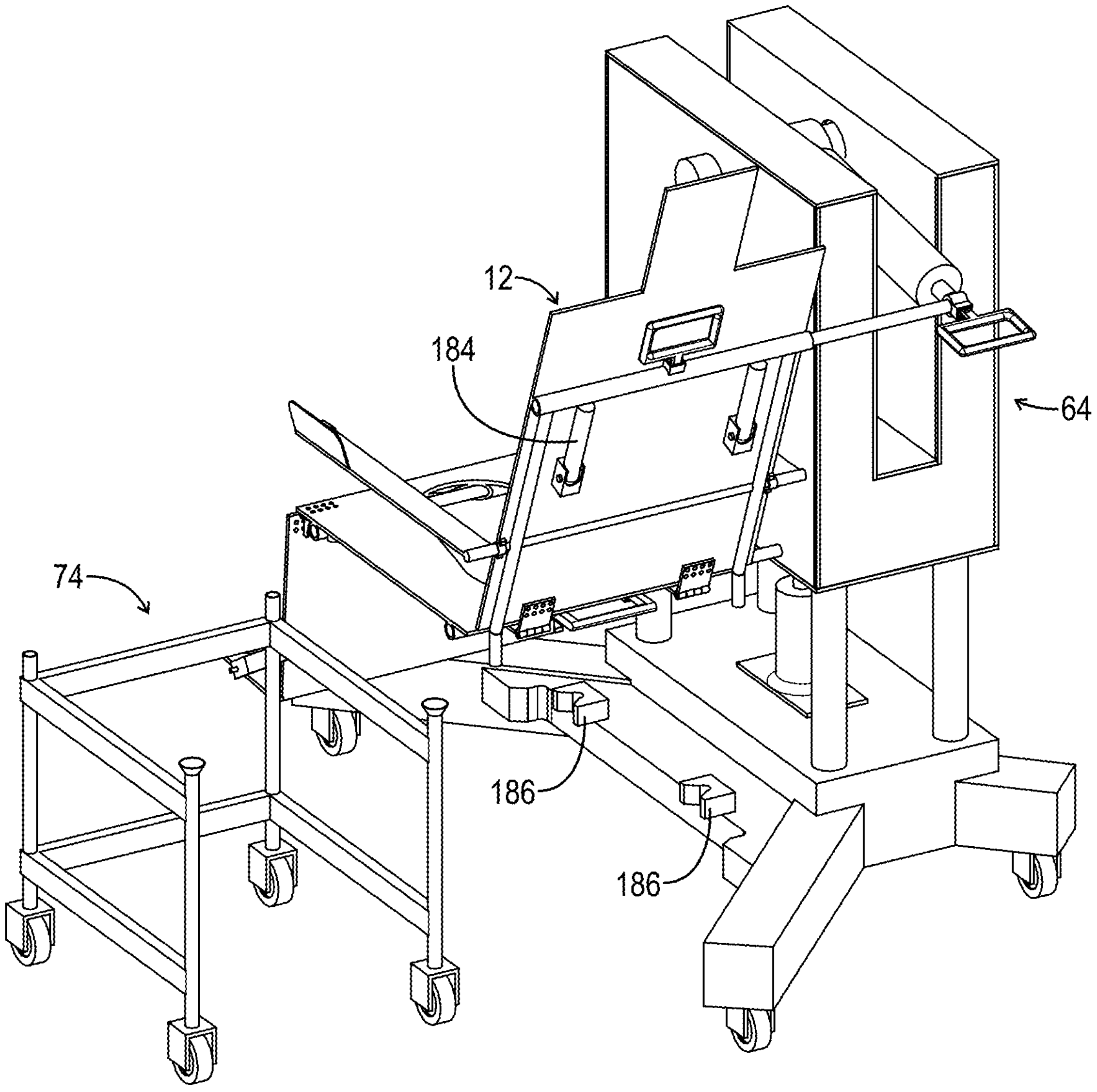
FIG. 39 illustrates a perspective view of a lift, mover base and bed plate of a version of the present invention.

In one or more versions, mover base 74 may be configurable to removably attach to bed plate 12 and may include a frame 136 comprising a bottom 82 comprising a plurality of wheels 84, a top 86 configurable to receive bed plate 12 when bed plate 12 may be in the seated configuration. Mover base 74 may also include one or more post receptacles 62 configurable to removably received one or more posts 90 of bed plate 12, and/or a plurality of rails 88 that may be located above and may be connected to plurality of wheels 84. In yet other versions, instead of posts 90 being located on bed plate 12 and post receptacles 62 being located on mover base 74, some or all of post receptacles 62 may be located on bed plate 12 and some or all of posts 90 may be located on mover base 74. In one or more versions, some, or all of post receptacles 62 may be conical/funnel-shaped as shown in FIGS. 14-15, to facilitate insertion of posts 90. In one or more versions, base 66 of lift 64 may include guides 186 (such as shown in FIG. 38) to position mover base 74 correctly to facilitate alignment of posts 90 with post receptacles 62. In addition, inserting posts 90 into post receptacles 62 may prevent back rest 26 from pivoting relative to seat rest 36 when bed plate 12 may be attached to mover base 74, and tilt arm 73 may also prevent back rest 26 from pivoting relative to seat rest 36 when bed plate 12 may be attached to lift 64. In yet other versions, horizontal pins 190 (such as shown in FIG. 34) may be placed through posts 90 and post receptacles 62 to lock posts 90 into post receptacles 62 to assist with preventing the patient from tipping over when moving over an irregular surface or threshold in mover base 74. In yet other versions, for added safety, frame 136 may include wedges 182 (such as shown in FIG. 33) that may engage back rest 26. If present, wedges 182 may include a wedge recess 183 that may engage pins 185 on back rest 26, which may prevent the patient from tilting when mover base 74 may be moved over a threshold or irregular surface. In yet other versions, wedges 182 may be located on a mover base second end 138. Although wedges 182 are shown as being on a back portion of mover base 74, it is also contemplated that the front portion of mover base 74 may also include wedges and or pins that prevent the patient from tilting when mover base 74 is moved.

In one or more versions, lift 64 may be configurable to removably attach to bed plate 12 when bed plate 12 may be in the co-planar configuration and thereby transfer bed plate 12 (and a patient lying on bed plate top 28) from bed 11 to mover base 74. In one or more versions, the transfer of bed plate 12 from bed 11 to mover base 74 may occur by first removably inserting transfer arms 72 into transfer arm receptacles 58 when upper section 68 may be at a first height and bed plate 12 may be in the co-planar configuration. Next, tilt arm 73 may be utilized to tilt back rest 26 relative to seat rest 36 to move bed plate 12 to the seated configuration. In a next step, bed plate 12 may be moved off bed 11 such as by moving lift 64 laterally away from bed 11. In a next step, seat rest 36 may be placed over mover base 74 so that post(s) 90 may be aligned with post receptacle(s) 62. In a next step, lift/moveable shaft/main piston 70 may be used to lower upper section 68 to a second height that may be lower than the first height so that post(s) 90 may be received in post receptacle(s) 62 such that bed plate 12 may be removably attached to and supported by mover base 74. In a next step, transfer arm(s) 72 may be removed from the transfer arm receptacle(s) 58. In one or more versions, the steps listed above can be performed in any order and the method of transferring bed plate 12 (and a patient lying on bed plate top 28) from bed 11 to mover base 74 should not be limited by the order the steps are recited in above.

In one or more versions, upper section 68 of lift 64 may include a top portion 76 and a bottom portion 78, having a height 80 extending from top portion 76 to bottom portion 78. Furthermore, transfer arms 72 may extend laterally and perpendicularly from upper section 68, as best seen in FIG. 1. In one or more versions, pivot arm actuator 120 may be pivotably connected adjacent an outer edge of upper section 68 of lift 64 by a pivot rod/pin 92 extending perpendicularly from upper section 68. In yet other versions, such as shown in FIGS. 19, and 26-27, 29 and 36-41, pivot rod/pin 92 may be located in a lengthwise center portion of lift upper section 68 adjacent top portion 76, which may allow lift 64 to be used on either side of bed 11.

Figure 2:
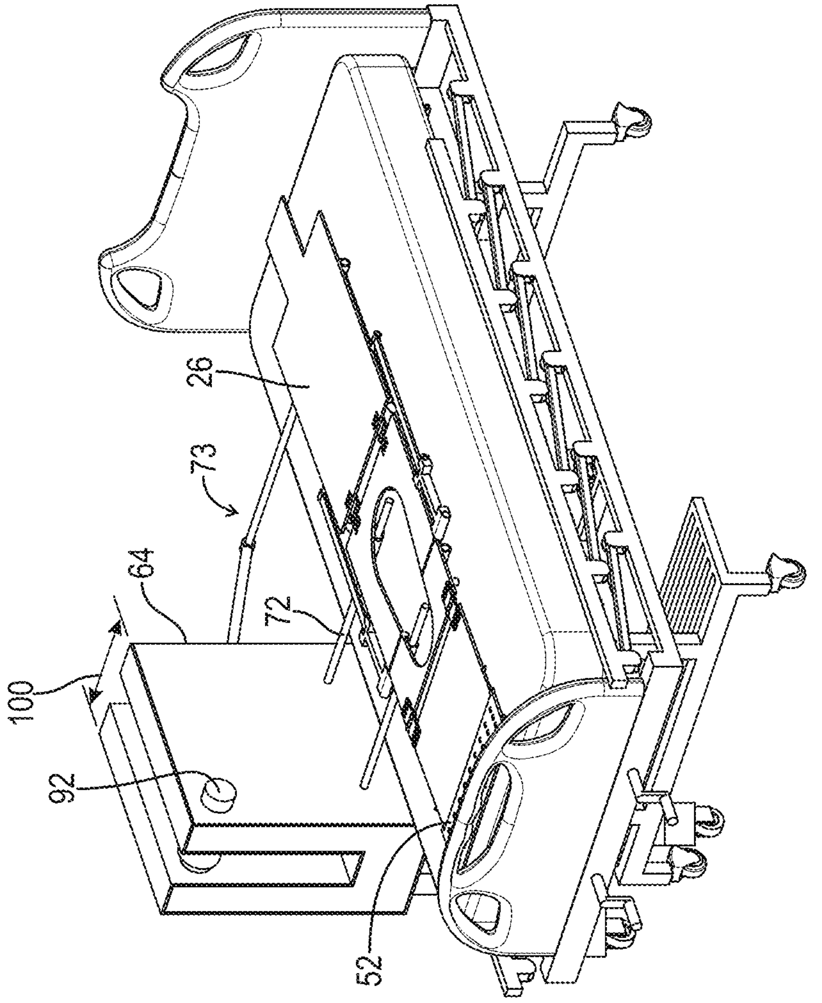
FIG. 2 illustrates a side perspective view of the lift and bed plate of FIG. 2 in which transfer arms of the lift are located in transfer arm receptacles of the bed plate and a tilt arm of the lift is located in a tilt arm receptacle of the bed plate.
Figure 3:
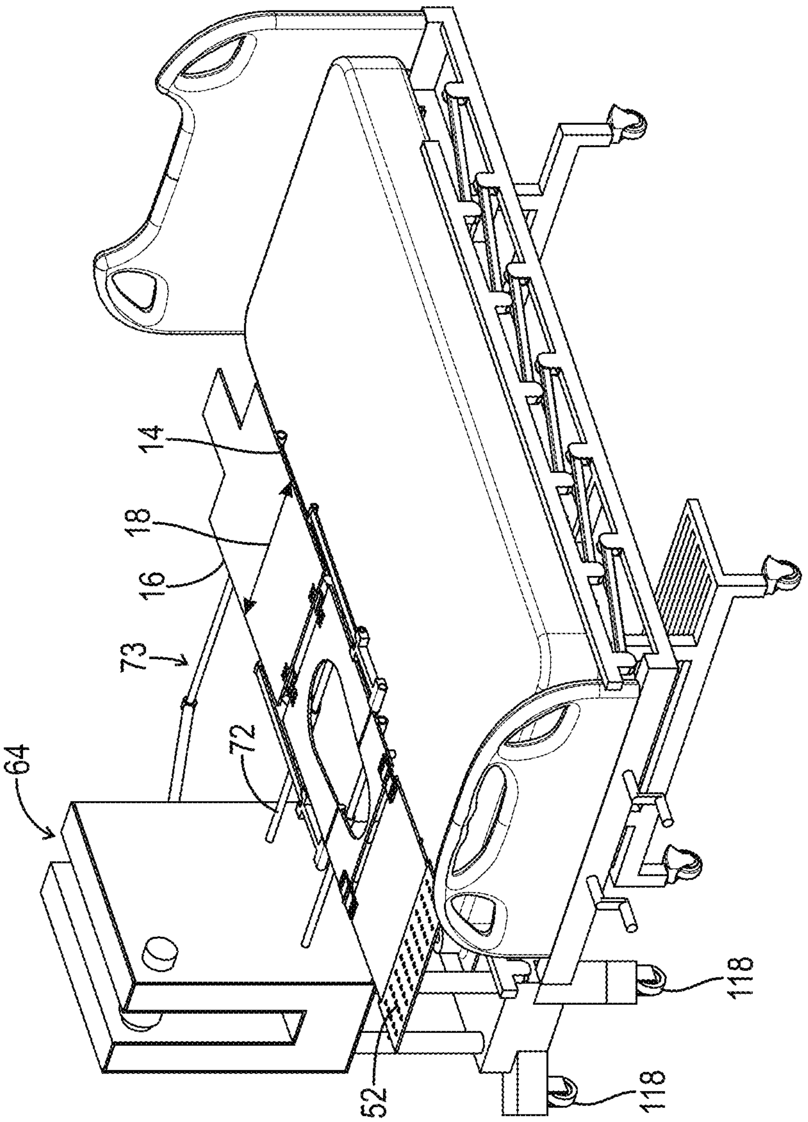
FIG. 3 illustrates a side perspective view of the lift and bed plate of FIG. 2 in which the transfer arms are located in the transfer arm receptacles and the tilt arm is located in the tilt arm receptacle and the lift has removed the bed plate from the bed.
Figure 8:
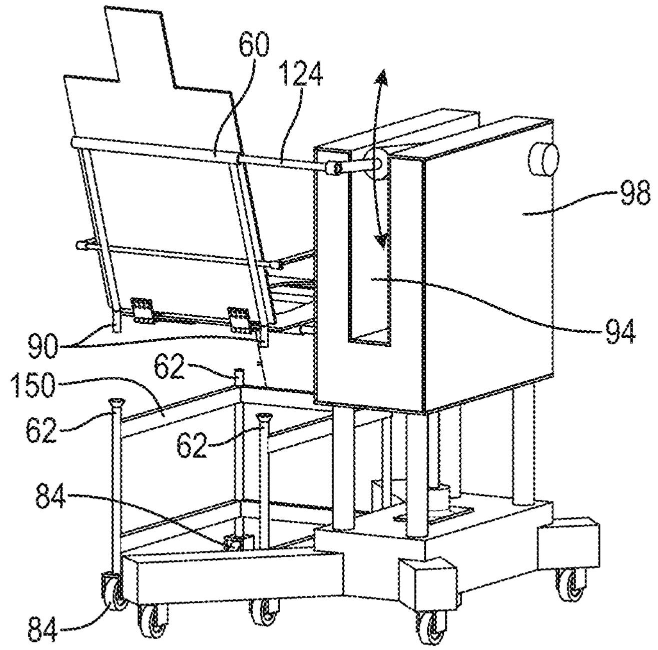
FIG. 8 illustrates a rear perspective view of the lift, bed plate, and mover base of FIG. 7.
Figure 9:
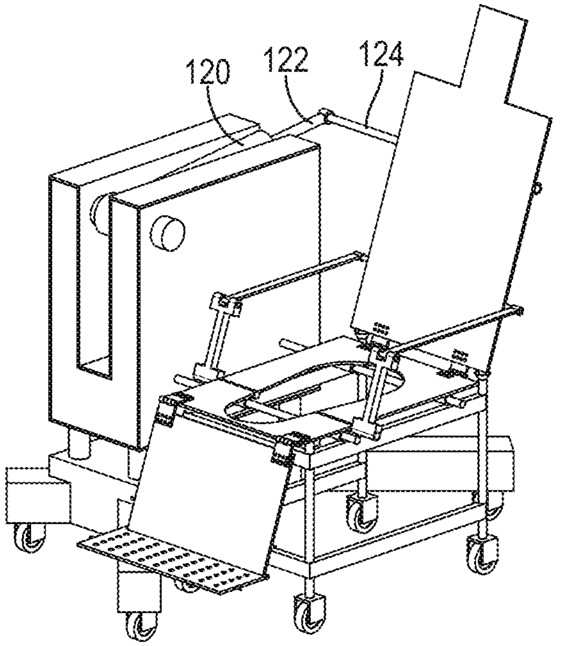
FIG. 9 illustrates a front perspective view of the lift, bed plate, and mover base of FIG. 8 in which the lift has lowered the bed plate onto the mover base.
Figure 10:
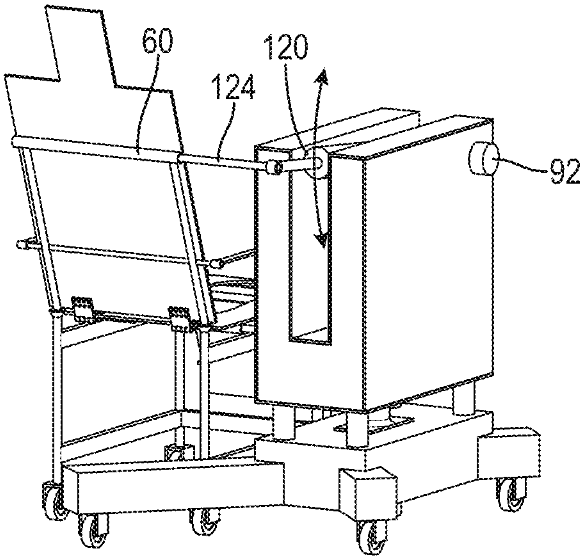
FIG. 10 illustrates a rear perspective view of the lift, bed plate, and mover base of FIG. 9.

In yet other versions, such as shown by the arrows in FIG. 8, pivot arm actuator 120 may be configured to move in an arc as it pivots about a pivot axis parallel to an upper section width 100 such as shown in FIG. 2. In yet other versions, upper section 68 may include a proximal end 96 (proximal relative to bed plate 12) configured to face bed plate 12 when lift 64 may be attached to bed plate 12 and may include transfer arm(s) 72. While a distal end 98 (relative to bed plate 12) may be configured to face away from bed plate 12 when lift 64 may be attached to bed plate 12, wherein width 100 extends from proximal end 96 to distal end 98. A U-shaped cavity 94 may be located between proximal end 96 and distal end 98, wherein U-shaped cavity 94 may provide space for pivot arm actuator 120 to move in an arc as it pivots. In yet other versions, pivot rod 92 may extend across U-shaped cavity 94. In yet other versions, pivot arm actuator 120 may further include a first arm 122 and a second arm 124 extending perpendicularly from first arm 122, as shown in FIGS. 1-11, such that second arm 124 may extend across bed plate width 18 when lift 64 may be connected to bed plate 12, as seen in detail in FIG. 5.

Figure 36:
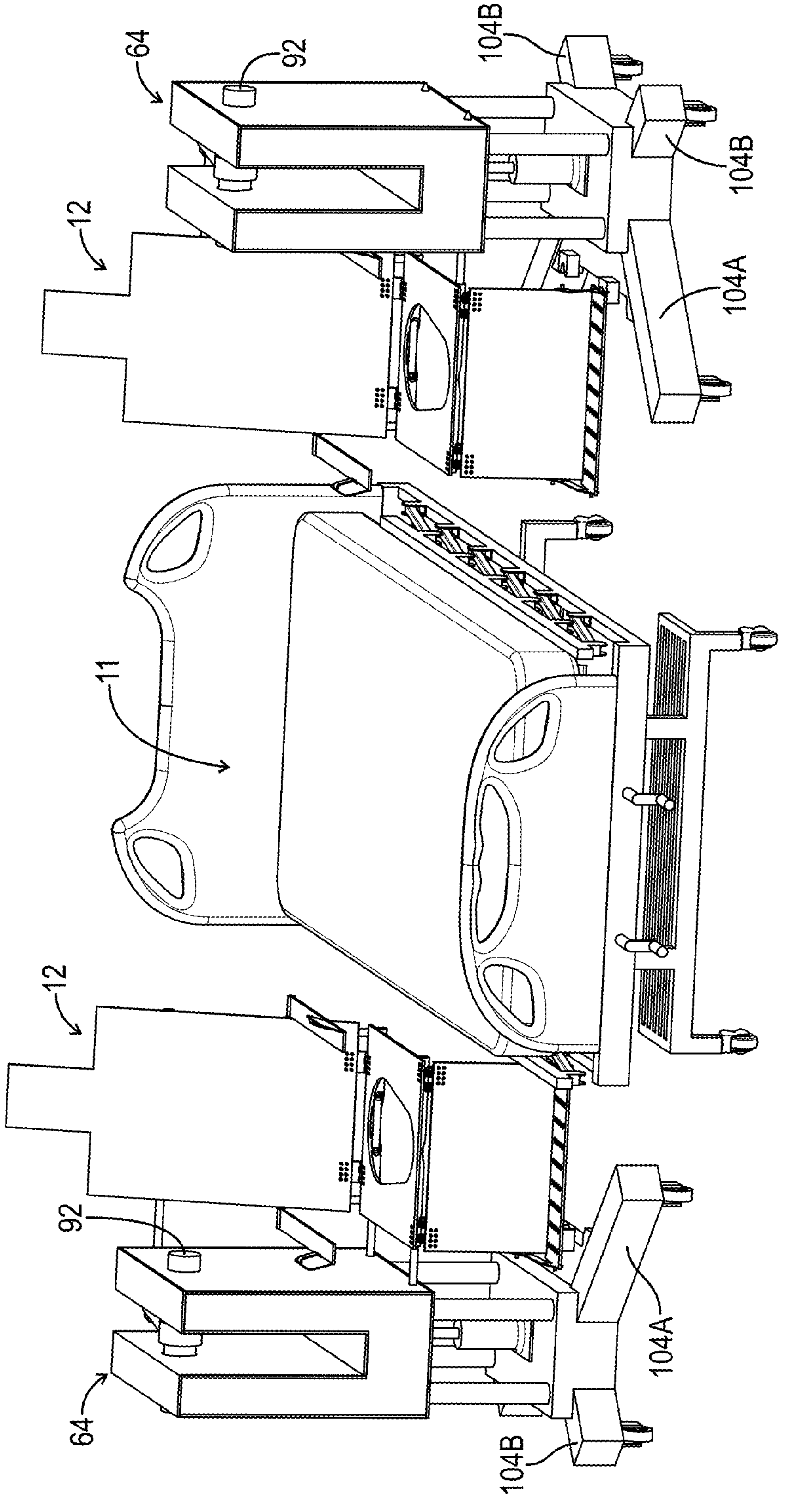
FIG. 36 illustrates a version of the system of the present invention showing a lift and a bed plate, showing that the lift may be used on either side of a bed.
Figure 37A:
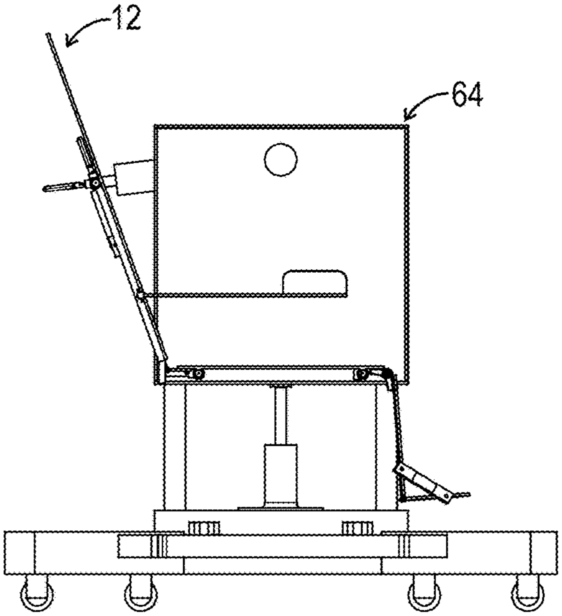
FIG. 37A illustrates a side view of a system of the present invention including a lift, mover base, and bed plate.
Figure 37B:
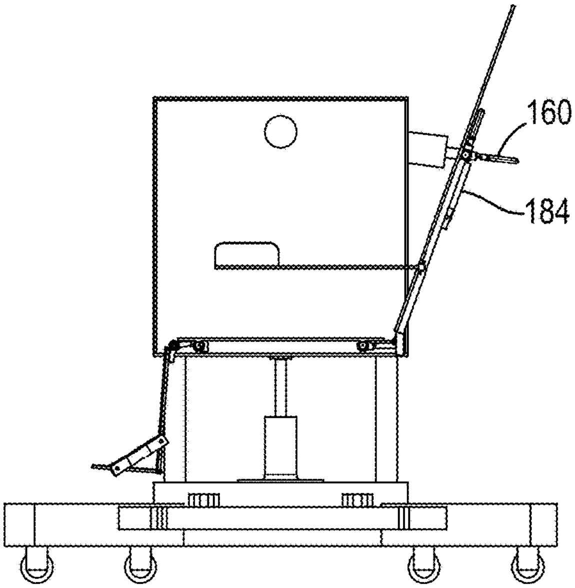
FIG. 37B illustrates a side view of a system of the present invention including a lift, mover base, and bed plate.
Figure 37C:
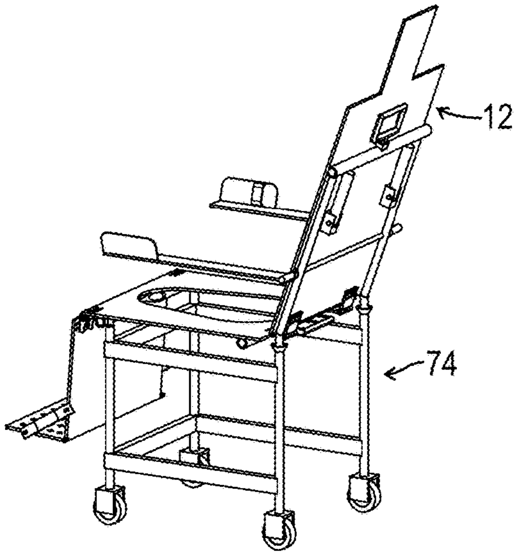
FIG. 37C illustrates a side perspective view of one version of a bed plate in a seated configuration secured on a mover base.
Figure 37D:
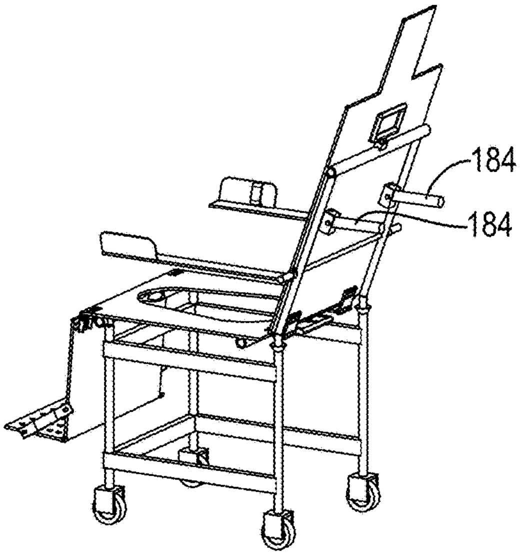
FIG. 37D illustrates a side perspective view of one version of a bed plate in a seated configuration secured on a mover base.
Figure 41:
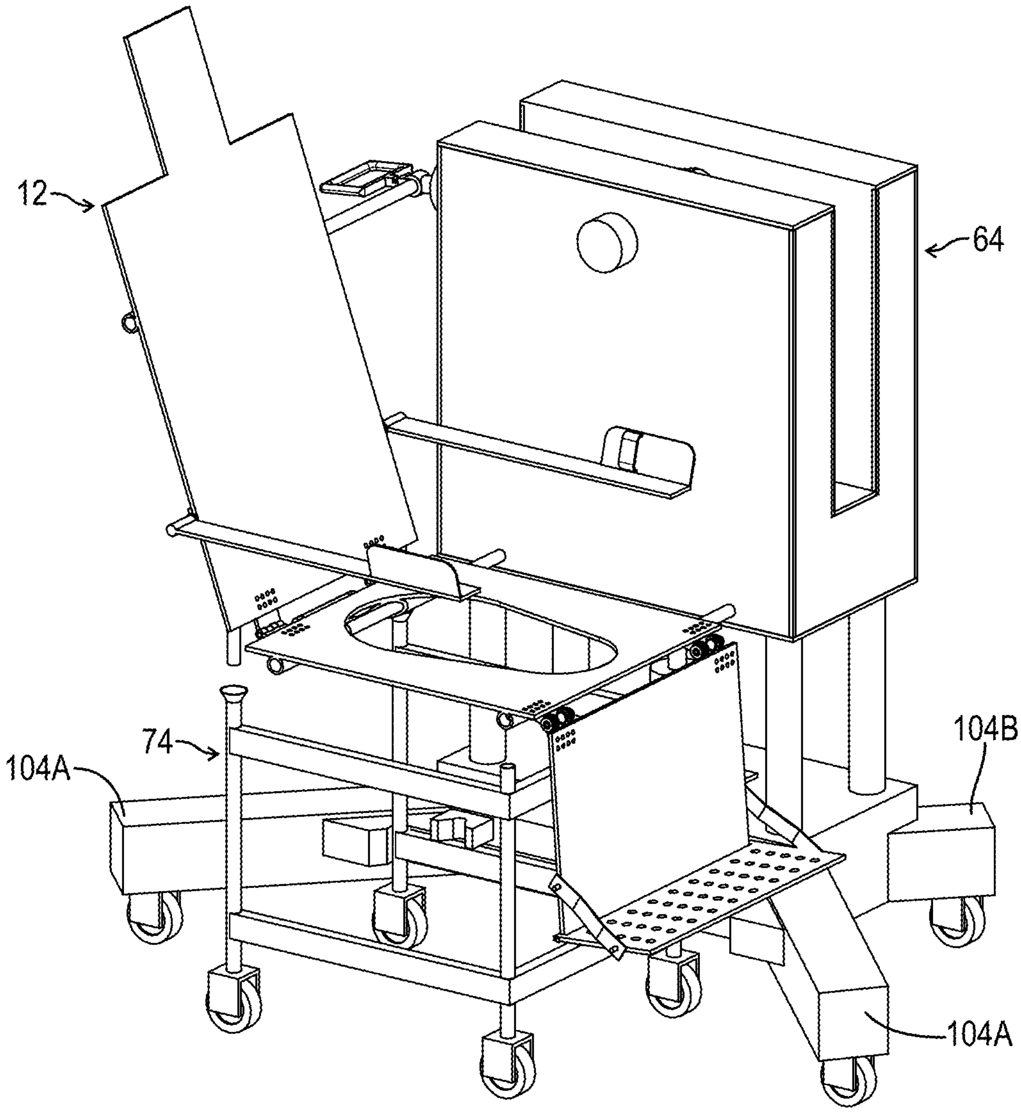
FIG. 41 illustrates a perspective view of a lift, mover base and bed plate of a version of the present invention.

In yet other versions, lift base 66 may be connected to and located below main piston 70 and include a plurality of legs 104 radiating from lift base 66 wherein each leg 104 of the plurality includes a wheel 118 as shown in FIGS. 1-11. Each leg 104 of the plurality may include a proximal end 106 (proximal relative to lift base 66) connected to lift base 66 and a distal end 108 (distal relative to lift base 66), wherein a length 110 extends from proximal end 106 to distal end 108. In yet other versions, one or more legs 104 of the plurality, such as, but not limited to the proximal legs (proximal relative to bed plate 12), may be configured to be located below bed plate 12 when lift 64 may be attached to bed plate 12, and one or more of the legs 104 of the plurality, such as, but not limited to the distal legs (distal relative to bed plate 12), are not configured to be located below bed plate 12 when lift 64 may be attached to bed plate 12. In one or more versions, proximal legs 104 may be longer than distal legs 104 to provide support for bed plate 12 when in an elevated position, as seen in FIGS. 4-6 and 36 and 41. In such versions, lift 64 may be positioned on a side of bed 11 so that bed plate 12 may be located above longer proximal legs 104A, as shown in FIGS. 36 and 41, wherein shorter distal legs 104B are positioned away from bed 11.

In one or more versions, lift 64 may further include a motor (not shown), such as, but not limited to, a brushless motor, configured to move pivot arm actuator 120 and main piston 70. In one or more versions, the motor may be powered by a lithium-ion rechargeable battery (not shown). In yet other versions, in lieu of a motor, transfer arms 72 and/or tilt arms 73 may be powered manually, such as by a manual crank (not shown). In yet other versions, as shown in FIGS. 6-13 and 15, back rest 26 may be angled at an angle of between about 30 to 90 degrees to seat rest 36 in the seated configuration, wherein foot rest 52 may be angled at an angle of between about 30 to 90 degrees to leg rest 42 in the seated configuration. In one or more versions, foot rest 52 may be removable from leg rest 42. In one or more versions, system 10 may further include an indication system and proximity sensor (not shown) configured to alert the user that transfer arms 72 are aligned with transfer arm receptacles 58 and/or to alert the user that tilt arm 73 may be aligned with tilt arm receptacle 60. In one or more versions, indication systems may include audible alarms and/or light systems to alert the user that tilt arm 73 may be aligned with tilt arm receptacle 60.

Figure 21:
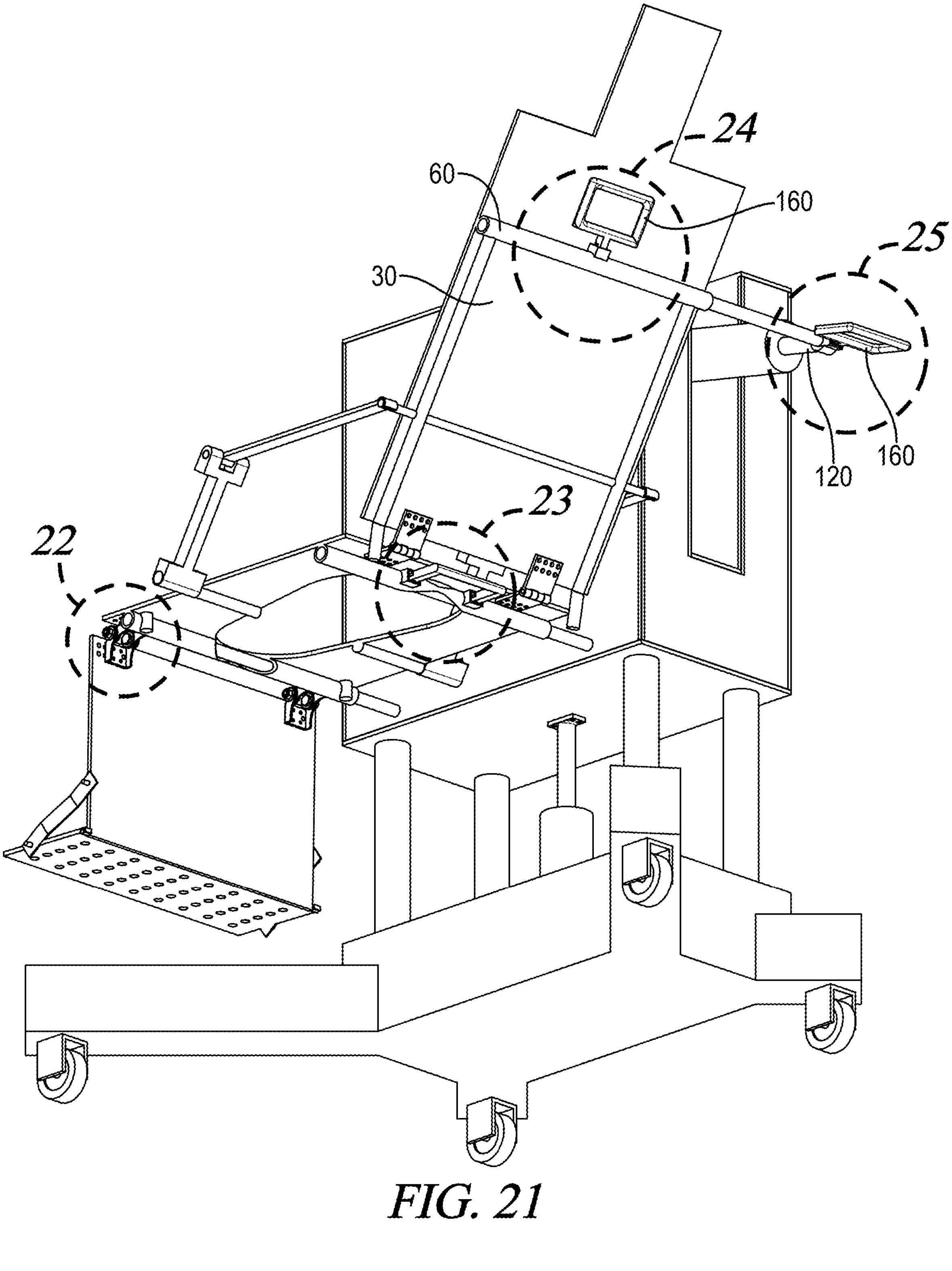
FIG. 21 illustrates a rear perspective view of a lift and bed plate of FIG. 19.
Figure 22:
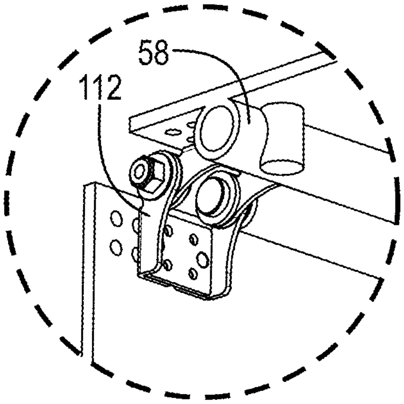
FIG. 22 illustrates a close-up perspective view of the circled area labelled 22 in FIG. 21.
Figure 24:
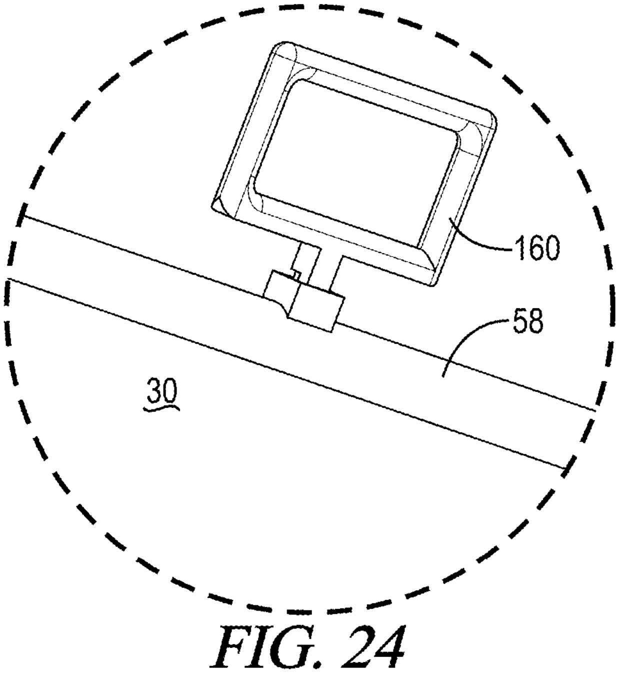
FIG. 24 illustrates a close-up perspective view of the circled area labelled 24 in FIG. 21.
Figure 23:
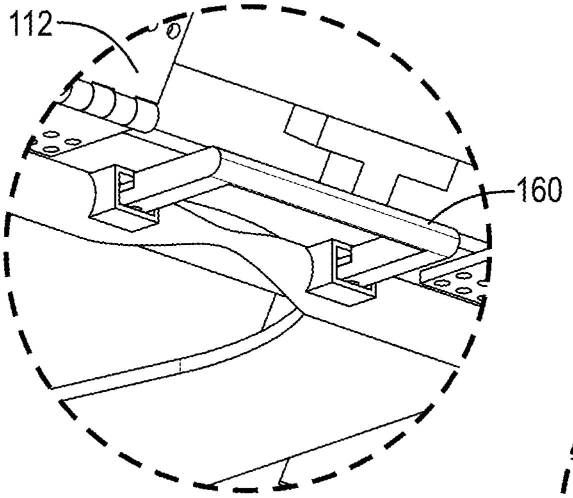
FIG. 23 illustrates a closeup perspective view of the circled area labelled 23 in FIG. 21.
Figure 25:
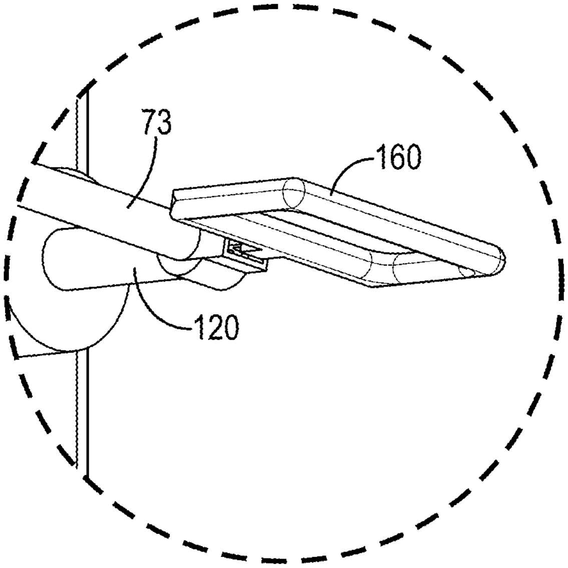
FIG. 25 illustrates a close-up perspective view of the circled area labelled 25 in FIG. 21.
Figure 26:
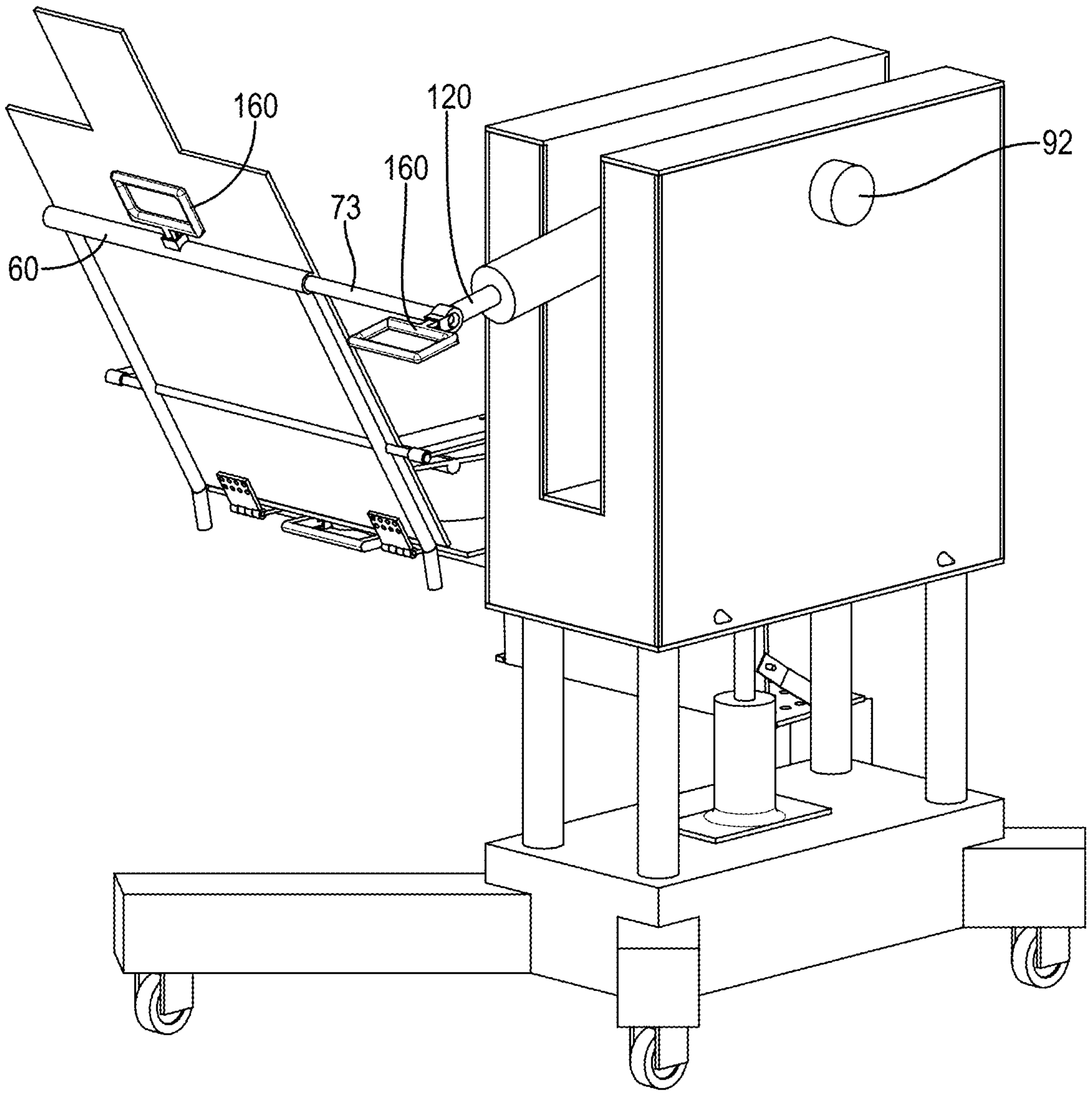
FIG. 26 illustrates another rear perspective view of a lift and bed plate of FIG. 19.
Figure 27:
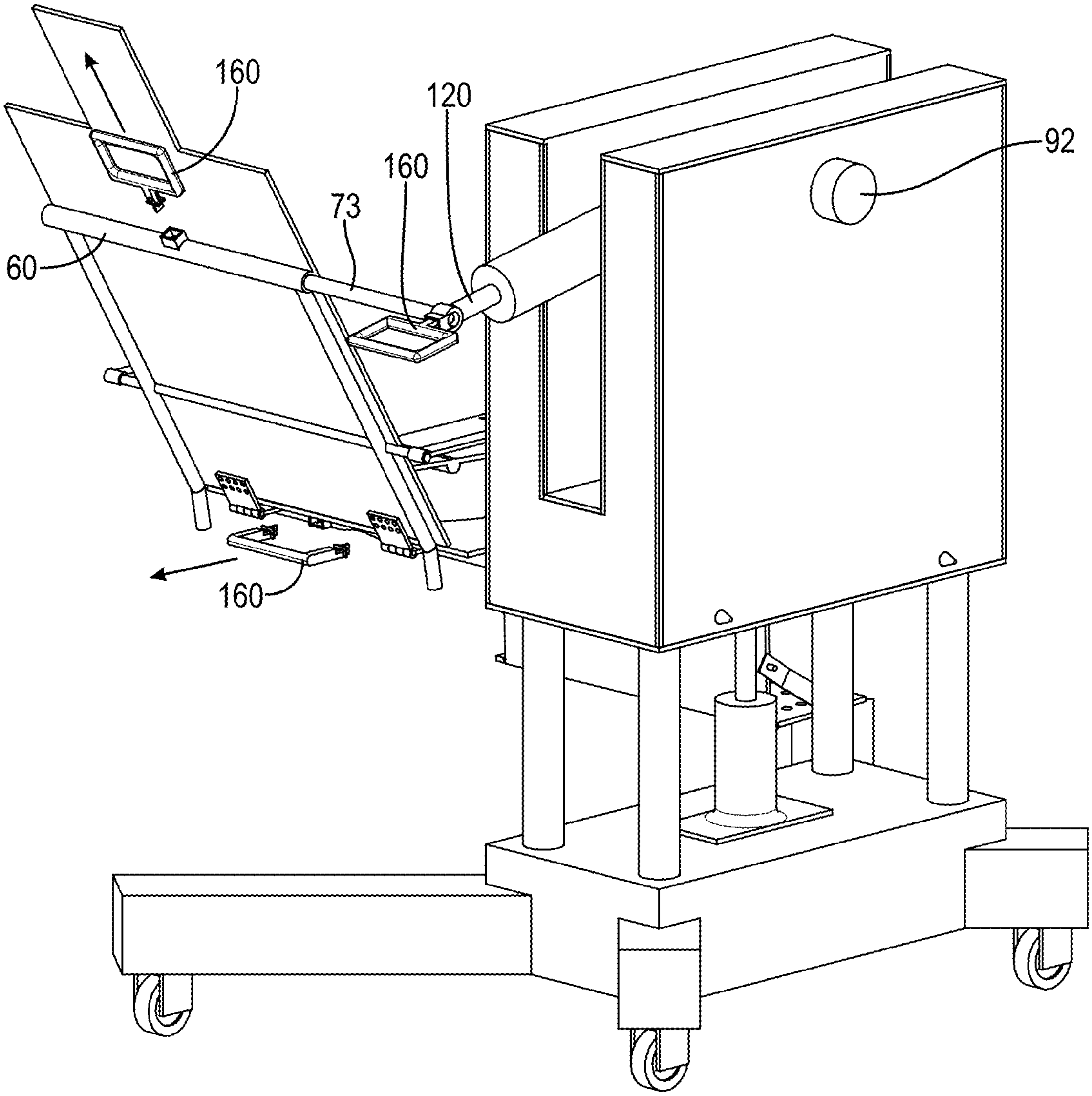
FIG. 27 illustrates a rear partially exploded perspective view of the lift and bed plate of FIG. 19 with the arrows showing how a lock may be disengaged.
Figure 28:
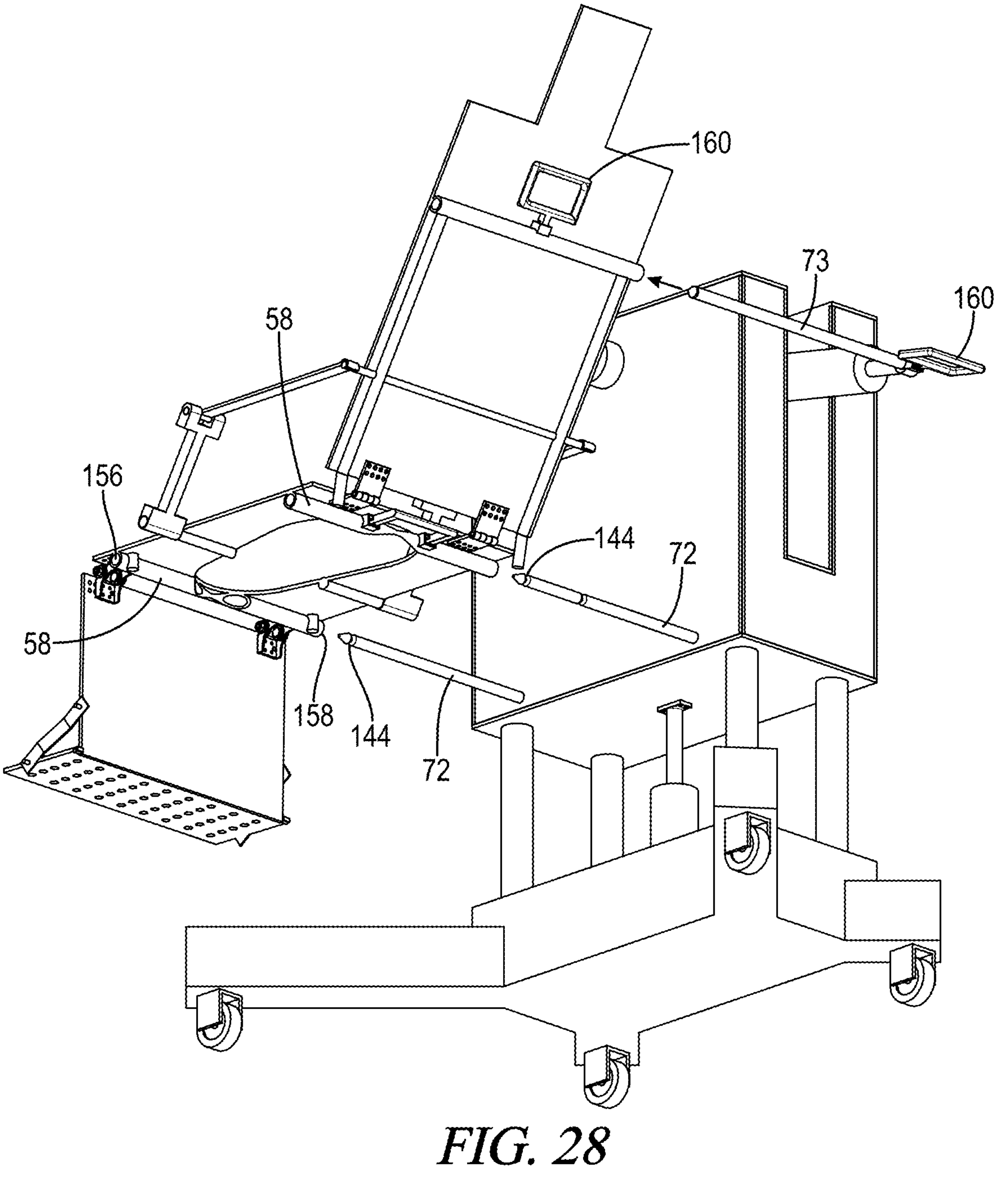
FIG. 28 illustrates a rear perspective view of the lift and bed plate of FIG. 19 prior to transfer arms being inserted into transfer arm receptacles.
Figure 29:
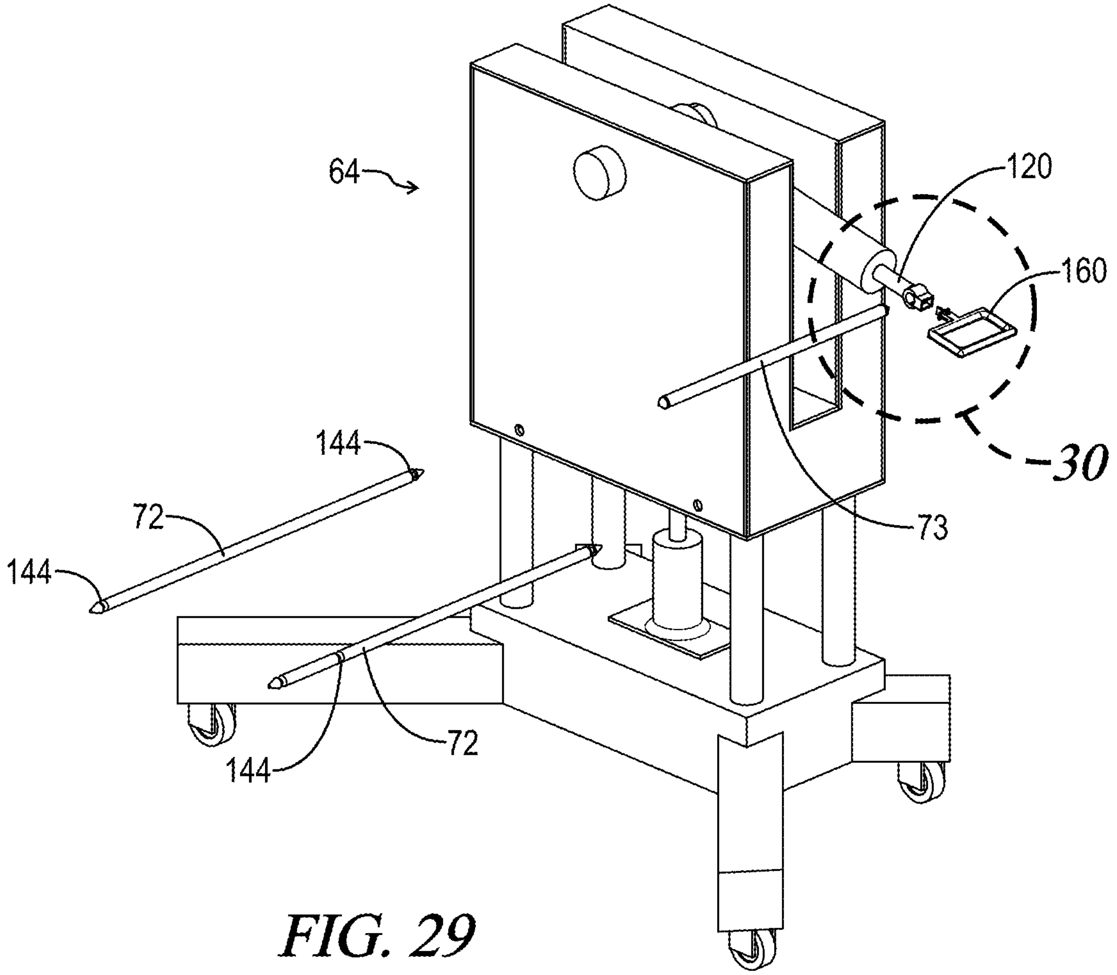
FIG. 29 illustrates a rear partially exploded perspective view of a lift of one version of the present invention.
Figure 30:
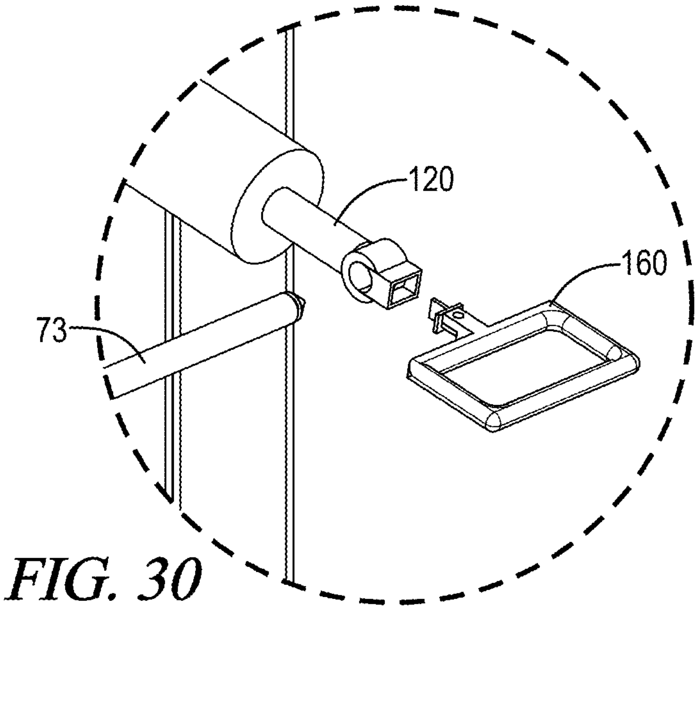
FIG. 30 illustrates a close-up perspective view of the circled area labelled 30 in FIG. 29.
Figure 31:
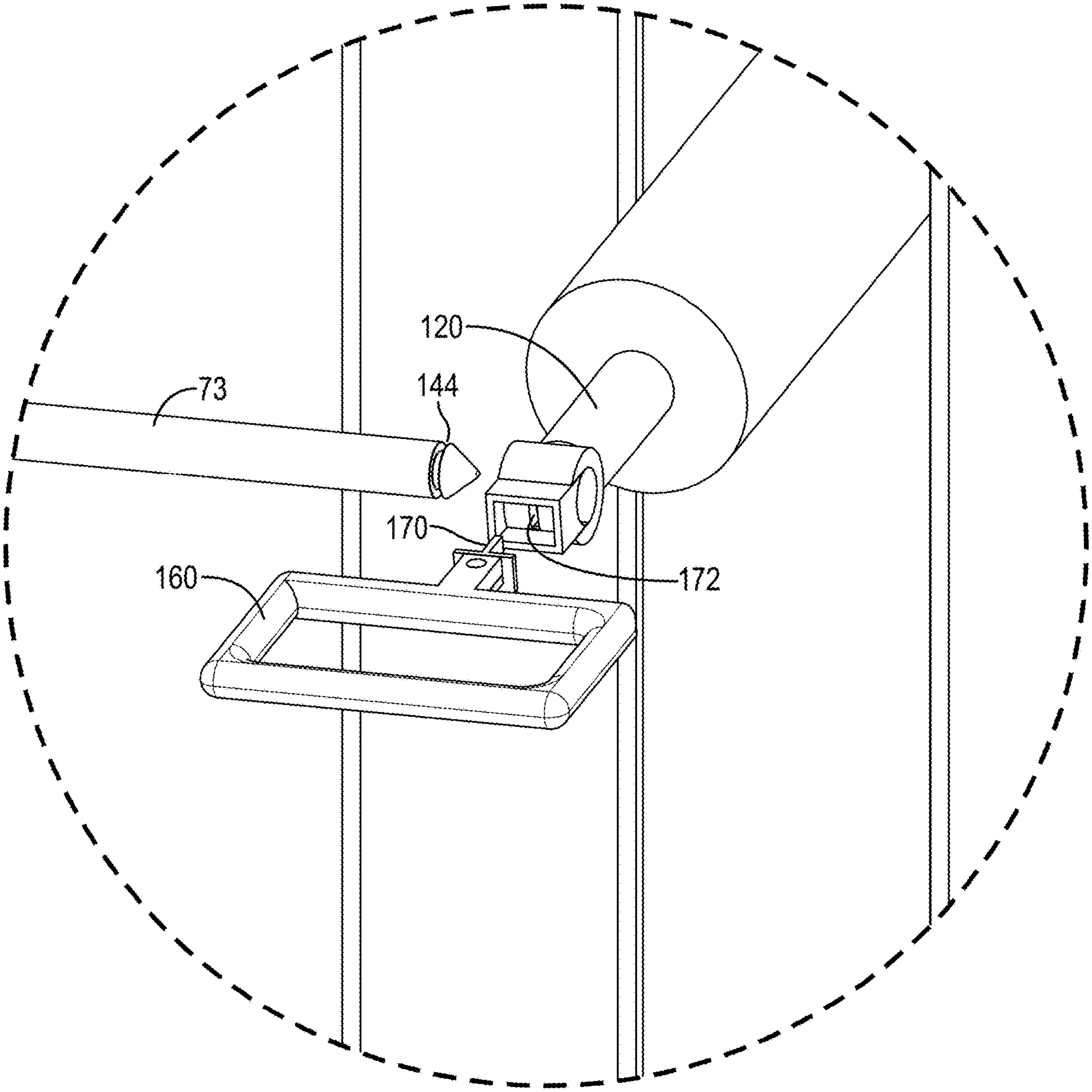
FIG. 31 illustrates a perspective, exploded view of a lock of the present invention.
Figure 32:
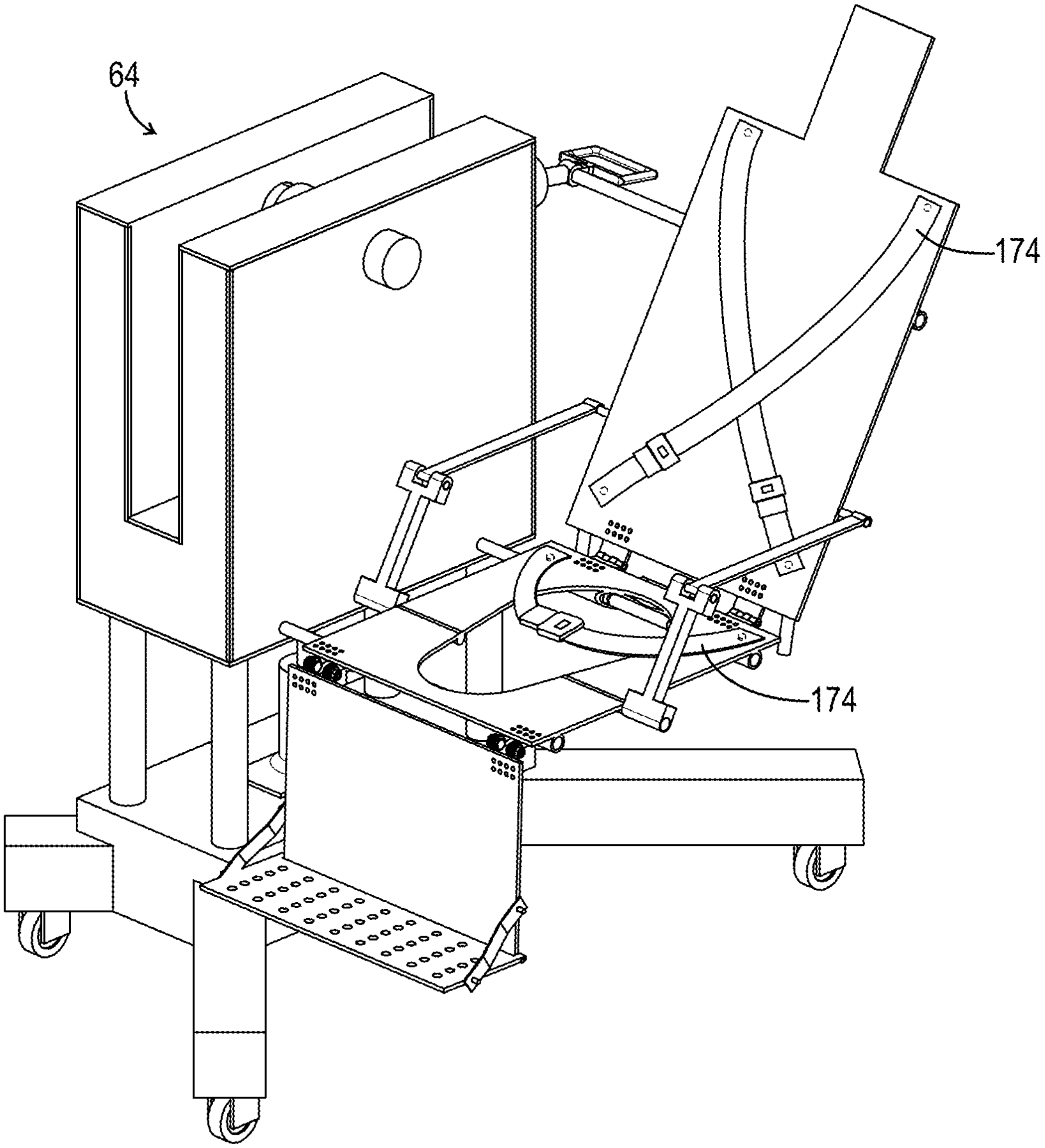
FIG. 32 illustrates a front perspective view of a lift and bed plate of another version of the present invention.
Figure 33A:
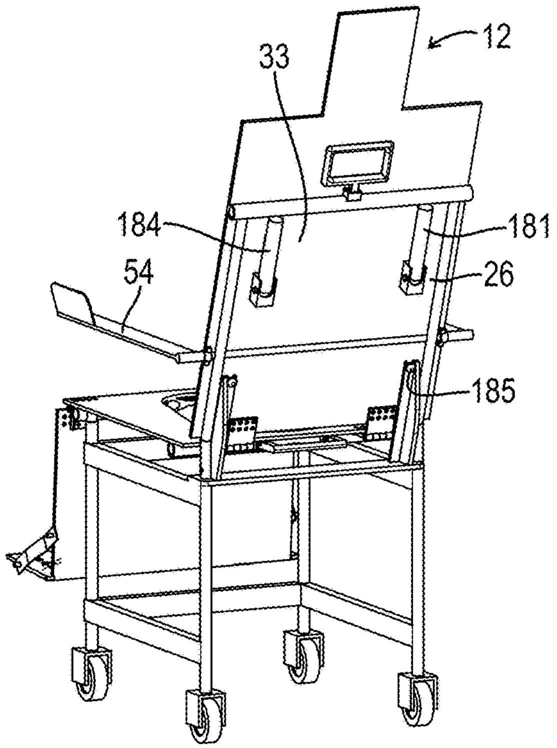
FIG. 33A illustrates a rear view of one version of a bed plate in a seated configuration on a mover base.
Figure 33B:
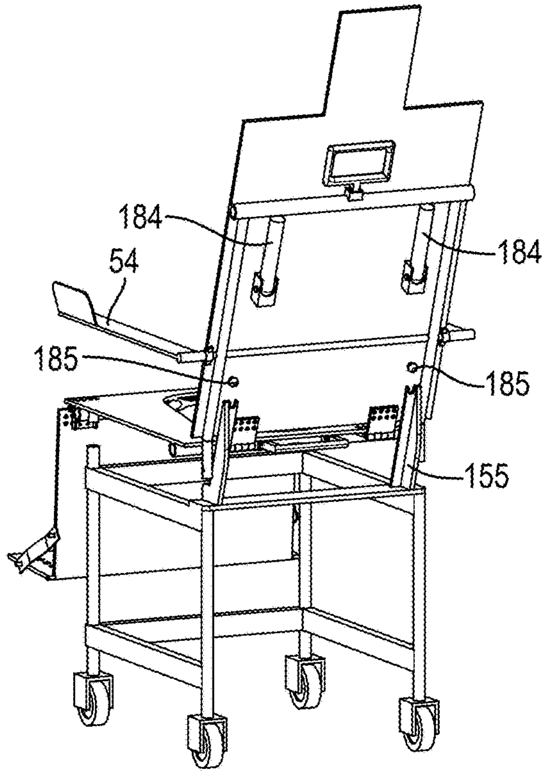
FIG. 33B illustrates a rear view of another version of a bed plate in a seated configuration on a mover base.
Figure 33C:
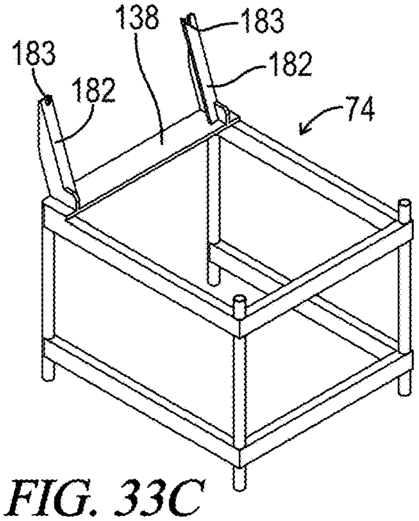
FIG. 33C illustrates a front perspective view of a version of a mover base.
Figure 33D:
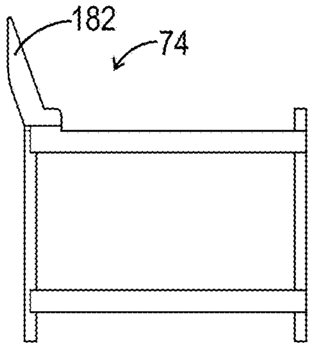
FIG. 33D illustrates a side perspective view of the mover base of FIG. 33C.
Figure 33E:
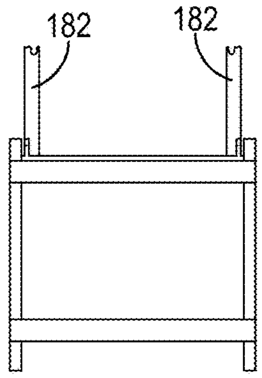
FIG. 33E illustrates a rear perspective view of the mover base of FIG. 33C.

In one or more versions, system 10 may further include one or more locks 160, such as shown in FIG. 21, to temporarily hold arms 72 and/or 73 in receptacles 58 and/or 60. As best seen in FIGS. 28-31, transfer arm 72 and/or tilt arm 73 may include one or more grooves 144 adjacent bed plate 12 that may extend about the perimeter/circumference of transfer arm 72 and/or tilt arm 73 and may interface with lock 160 on bed plate 12 to prevent transfer arm 72 and/or tilt arm 73 from moving out of receptacle 58 and/or 60. In yet other versions, transfer arm 72 and/or tilt arm 73 may include another groove(s) 144 adjacent lift 64 that may extend about the perimeter/circumference of transfer arm 72 and/or tilt arm 73 and may interface with lock 160 on lift 64 to allow transfer arm 72 and/or tilt arm 73 to detach from lift 64 in order to allow the user to push lift 64 through a narrow doorway or to allow the user to use transfer arms 72 and/or tilt arms 73 of different lengths. In yet other versions, as shown in FIGS. 21-30, locks 160 may be in the form of a handle that may be pulled by the user. In yet other versions, as shown in FIG. 31, a T-Arm 170 may go into a slot 172 and may fit into groove 144. Tilt arm 73 may not be able to move out of the applicable receptacle once T-Arm 170 may be engaged in groove 144. It may be appreciated that FIG. 31 shows how tilt arm 73 may releasably be attached to pivot arm actuator 120, however, a similar mechanism may couple tilt arm 73 to tilt arm receptacle 60 and transfer arm 72 to transfer arm receptacle 58. It may be appreciated that other locking mechanisms may be used.

Figure 11:
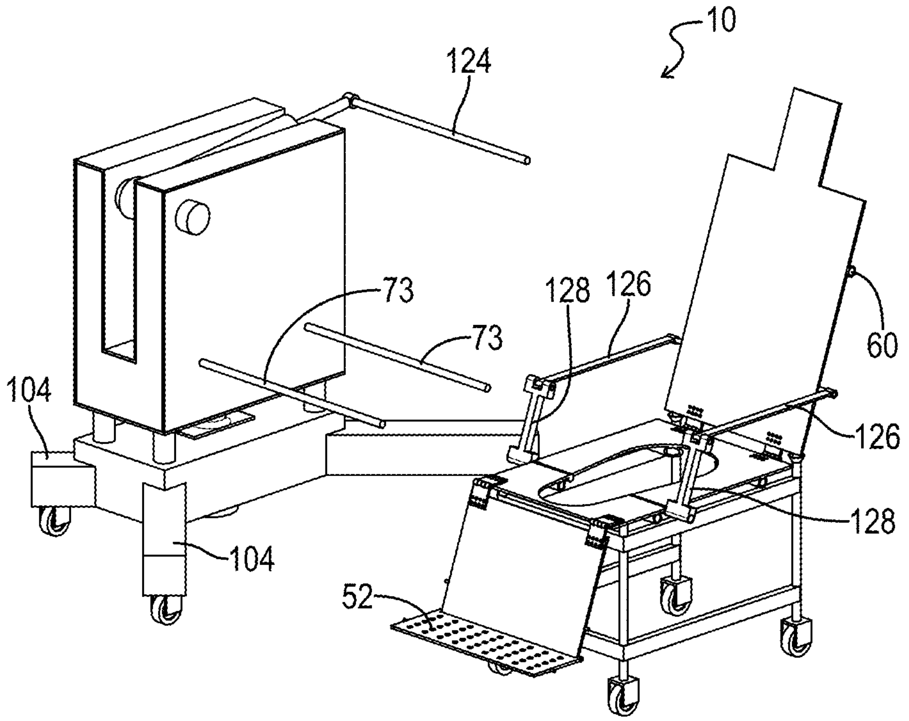
FIG. 11 illustrates a front perspective view of the lift, bed plate, and mover base of FIG. 10 in which the lift has moved laterally and disengaged from the bed plate.

In one or more versions, as best seen in FIG. 14, frame 136 of mover base 74 may be rectangular and mover base second end 138 may include open portion and a hollow interior 140 to allow mover base 74 to be placed over a toilet, for example. In one or more versions, as best seen in FIG. 11, bed plate 12 in the seated configuration has about the same width and length as mover base 74. In one or more versions, as shown in FIGS. 8-11, for example, mover base 74 may include two front wheels 84 and two rear wheels 84. In one or more versions, front wheels 84 may be situated directly below a seat rest first end 46, front posts 90, and/or front post receptacles 62 of bed plate 12; and rear wheels 84 may be situated directly below a seat rest second end 44, rear posts 90, and/or rear post receptacles 62 of bed plate 12. In one or more versions, as shown in FIGS. 7-11, a first side 150, a second side 152, a first end 154 and second end 138 of mover base frame 136 may be aligned with a first side 146, a second side 148, first end 46 and second end 44 of the seat rest 36, respectively, so that mover base frame 136 may be aligned with seat rest 36.

In one or more versions, back rest 26 may be attached to seat rest 36 by one or more hinges 112, leg rest 42 may be attached to seat rest 36 by one or more hinges 112, and foot rest 52 may be attached to leg rests 42 by one or more hinges 112. In one or more versions, transfer arm(s) 72 and transfer arm receptacle(s) 58 may be cylindrical in shape and/or tilt arm(s) 73 and tilt arm receptacle(s) 60 may be cylindrical in shape. In yet other versions, transfer arm(s) 72 and/or tilt arm(s) 73 may include other non-cylindrical shapes such as being flat or forked. In such versions, transfer arm receptacle(s) 58 and/or tilt arm receptacle(s) 60 may include reciprocal shapes to accommodate the various shapes of transfer arm(s) 72 and/or tilt arm(s) 73. In one or more versions, transfer arm receptacle(s) 58 and tilt arm receptacle(s) 60 may each include an open first end 158 and an open second end 156 with a hollow interior between open first end 158 and open second end 156 to allow lift 64 to be used on either side of bed 11, as shown in FIG. 36. In one or more versions, as shown in FIG. 1 for example, transfer arm(s) 72 and/or tilt arm 73 may include a free end 116 and/or 114 that may be tapered to facilitate insertion into transfer arm/tilt arm receptacle 58/60, rounded for safety and/or that may be expandable after insertion through the ends of transfer arm/tilt arm receptacle 58/60 to lock transfer arm/tilt arm 72/73 in place.

In one or more versions, one or more of the hinges 112, such as, but not limited to hinge(s) 112 attaching seat rest 36 to foot rest 52 and/or seat rest 36 to back rest 26) may be a friction hinge so to provide resistance to movement of seat rest 36. In the context of the present disclosure, a friction hinge may be a hinge providing resistance to the pivoting motion of the hinge. Friction hinges may control or hold motion when pivoting objects open and close.

Figure 12:
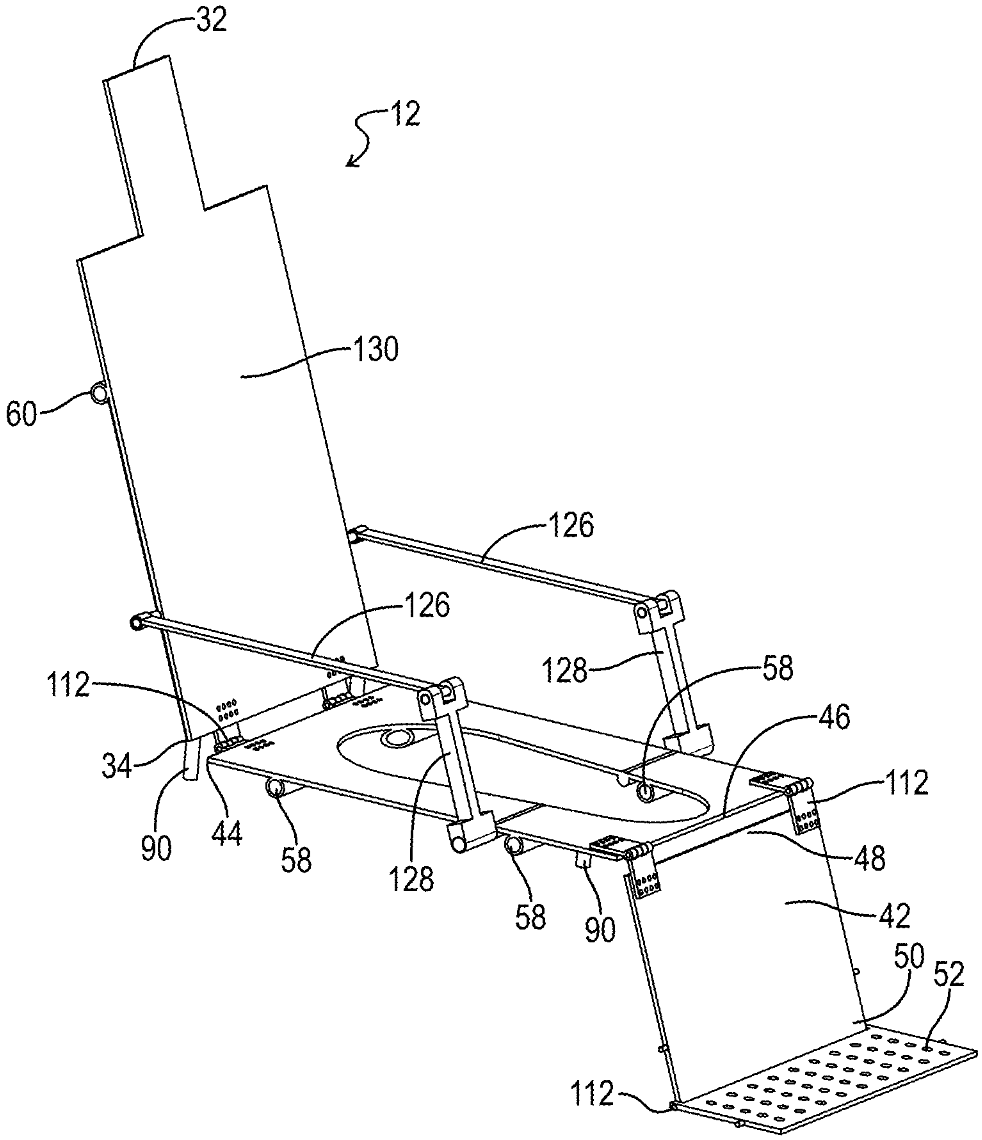
FIG. 12 illustrates a top, side perspective view of the bed plate of FIG. 11.
Figure 13:
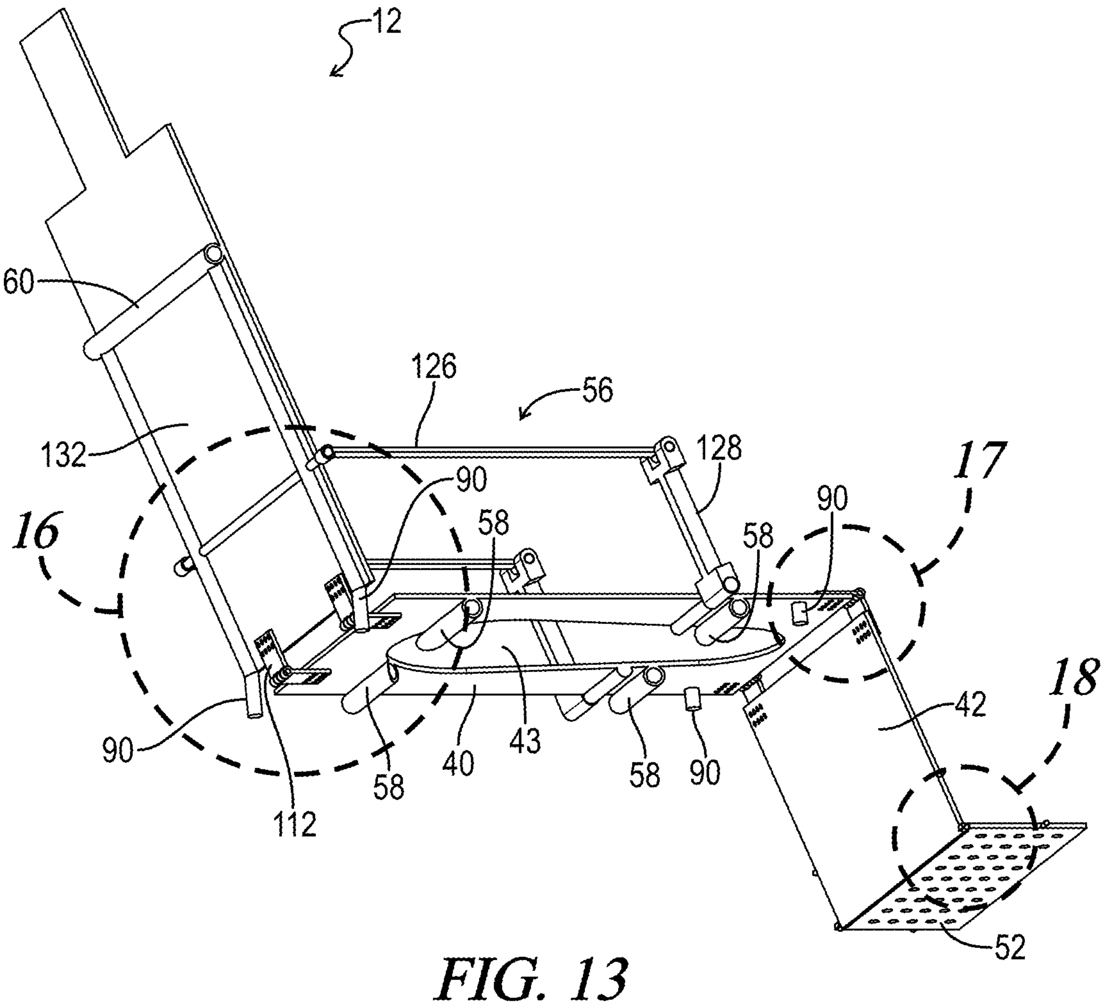
FIG. 13 illustrates a bottom, side perspective view of the bed plate of FIG. 12.

In one or more versions, as best seen in FIGS. 12-13, back rest 26 may include a first end 34 adjacent seat rest 36 and a second end 32 opposite first end 34 and located at bed plate rear end 20. In one or more versions, second end 32 may be narrower than second end 34 so as to support a patient's head. In one or more versions, as best seen by comparing FIG. 6 with FIGS. 4 and 5, first and second arm rests 54/56 may be configured to pivot/expand upward when bed plate 12 moves from the co-planar configuration to the seated configuration.

Figure 4:
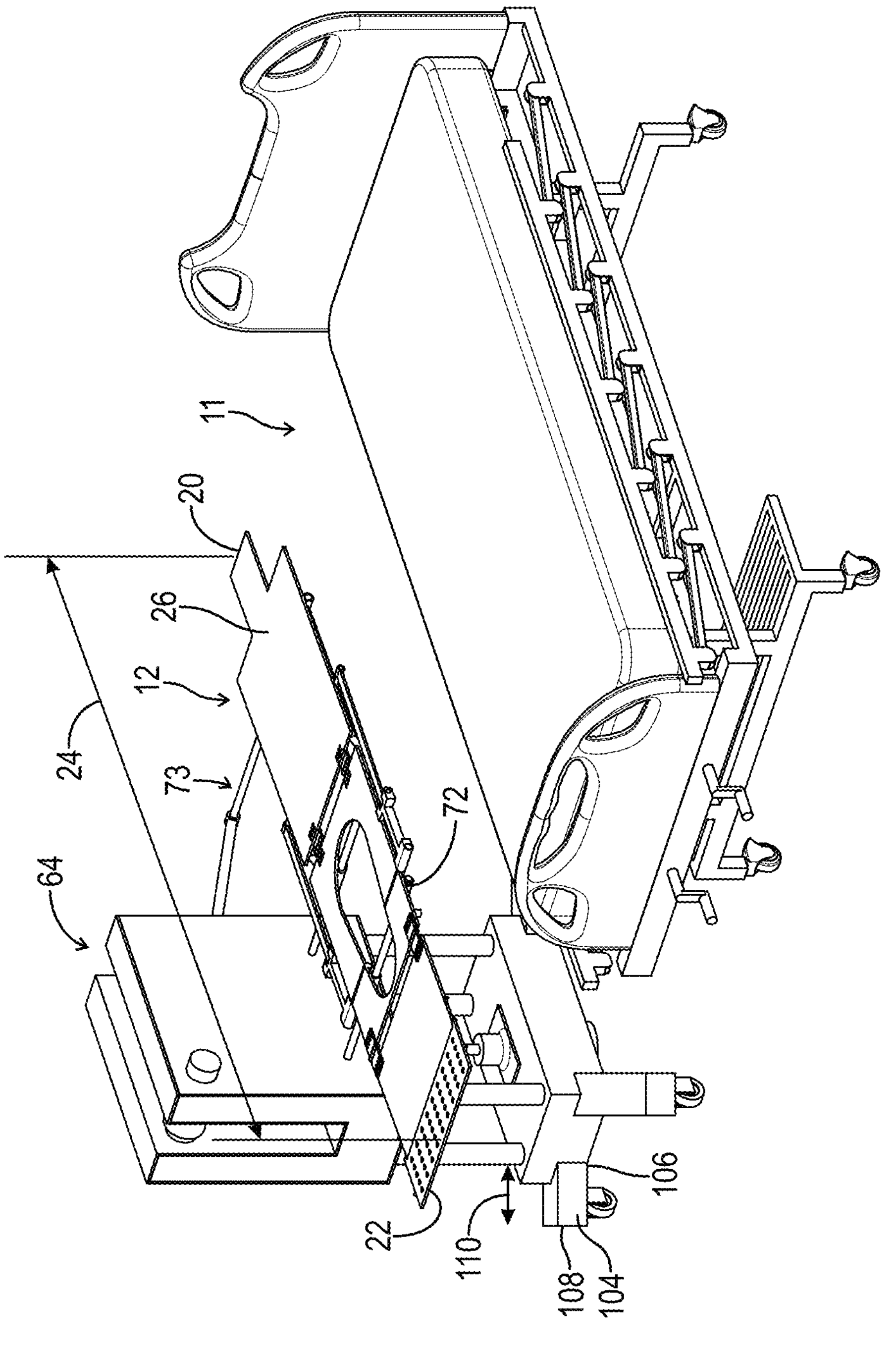
FIG. 4 illustrates a side perspective view of the lift and bed plate of FIG. 3 in which the transfer arms are located in the transfer arm receptacles and the tilt arm is located in the tilt arm receptacle and the lift has removed the bed plate further from the bed.
Figure 5:
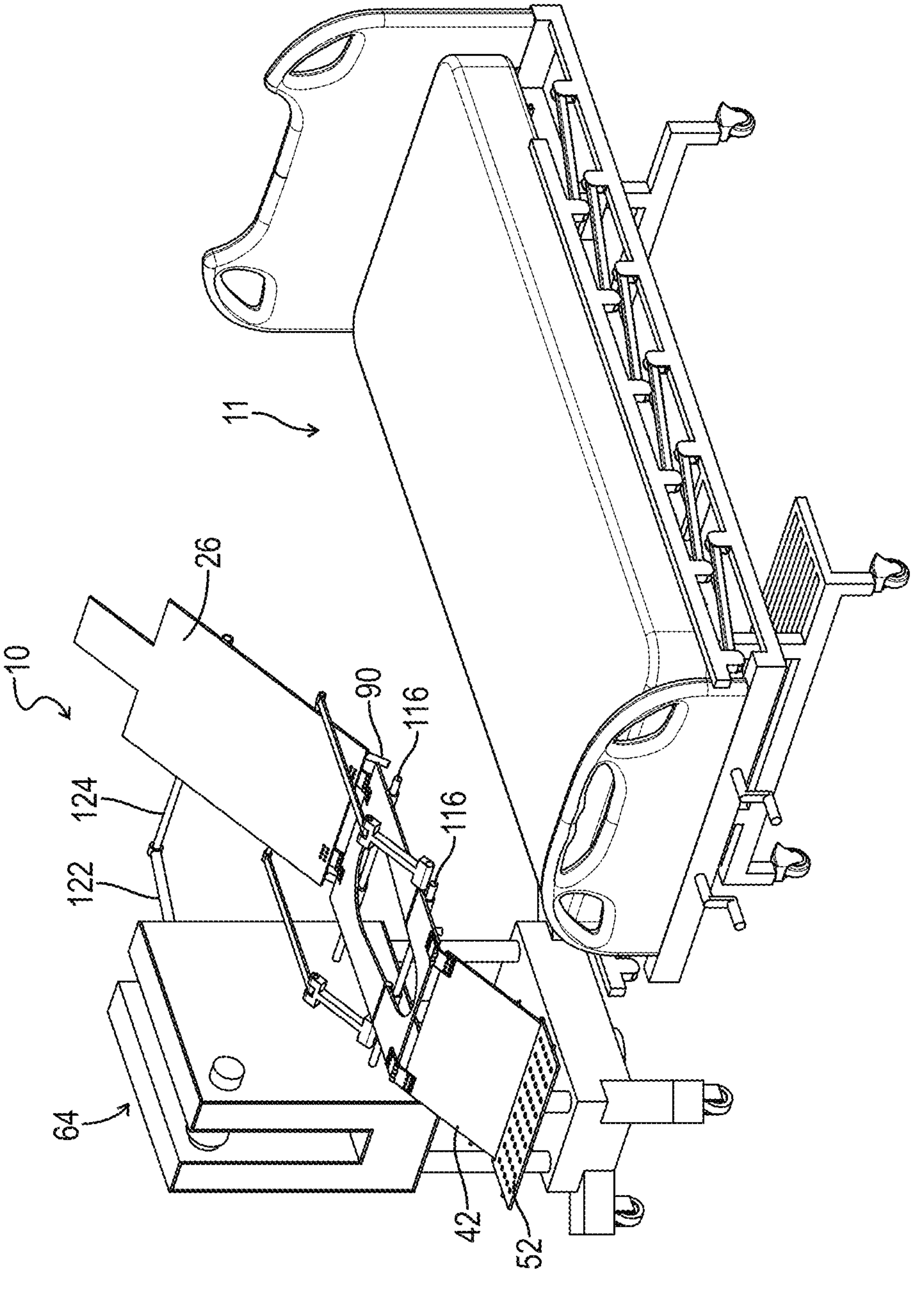
FIG. 5 illustrates a side perspective view of the lift and bed plate of FIG. 4 in which the transfer arms are located in the transfer arm receptacles and the tilt arm is located in the tilt arm receptacle, the lift has removed the bed plate from the bed, the tilt arm has tilted a back rest of the bed plate relative to a seat rest of the bed plate, a leg rest of the bed plate has tilted relative to the seat rest and a foot rest of the bed plate has tilted relative to the leg rest.
Figure 6:
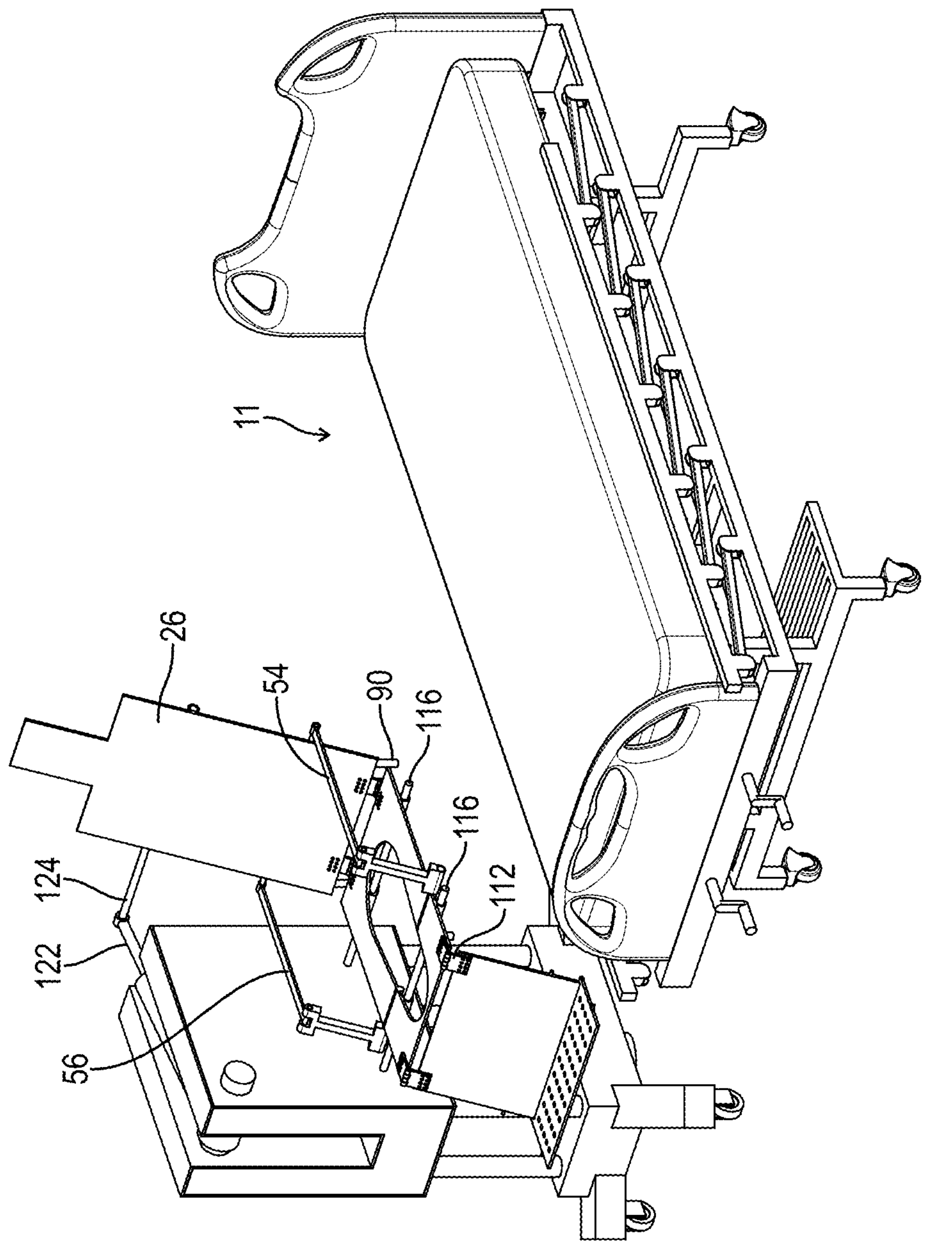
FIG. 6 illustrates a side perspective view of the lift and bed plate of FIG. 5 in which the tilt arm has further tilted the back rest relative to the seat rest, the leg rest has further tilted relative to the seat rest and the foot rest has further tilted relative to the leg rest so that the bed plate is in a seated configuration.
Figure 7:
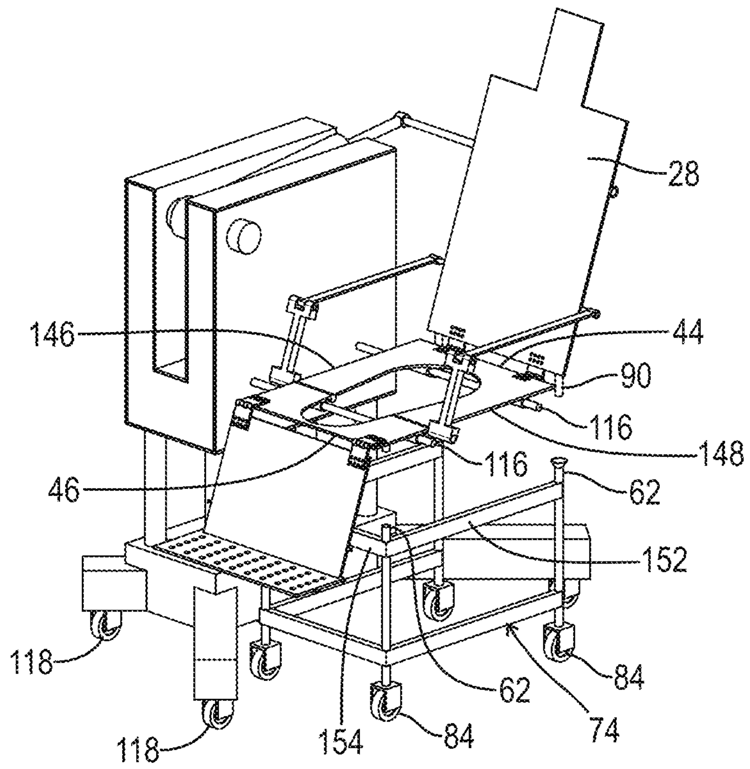
FIG. 7 illustrates a front perspective view of the lift and bed plate of FIG. 6 in which the lift has placed the bed plate over a mover base of one version of the present invention.

In one or more versions, each of first arm rest 54 and second arm rest 56 may include a first portion 126 connected to back rest 26 and a second portion 128 pivotably connected to first portion 126 and seat rest 36, and, as best seen by comparing FIG. 6 with FIGS. 4 and FIG. 5, first portion 126 may be configured to pivot relative to second portion 128 and seat rest 36 when bed plate 12 moves from the co-planar configuration to the seated configuration. In one or more versions, first portion 126 may be configured to pivot relative to second portion 128 and seat rest 36 from a position in which second portion 128 may be co-planar with seat rest top 38 to a position in which second portion 128 may extend upward at an angle of between about 45-degrees to about 90-degrees relative to seat rest 36. In one or more versions, as best seen in FIG. 13, post receptacles 62 may extend downwardly from back rest 26 and seat rest 36 in the seated position. FIGS. 33-41 show alternative versions of arm rests 54 and 56 which may reduce pinch points and allow caregivers to locate a patient's wrist and provide a line-of-sight to position an IV. Said arm rests 54 and 56 as shown in FIGS. 33-41 may pivot, for example, 180-degrees relative to back rest 90 from a position in which arm rests 54 and 56 extend downwardly below and parallel to back rest 94 to the 90-degree position shown in FIG. 34, for example, to a position in which arm rests 54 and 56 may extend upward and parallel to back rest 90. In one or more versions, locking hinges may be used to secure arm rests 54 and 56 at desired angles. In one or more versions, arm rests 54 and 56 may also include straps 174. In one or more versions, arm rests 54 and 56 may include a tilted portion 180.

In one or more versions, as shown in FIGS. 33-41, bed plate 12 may further include one or more handles 184 to allow a user to push the user like a wheel chair when bed plate 12 may be attached to mover base 74. Handles 184 may be removable or collapsible when not in use. In one or more versions, handle(s) 184, when engaged for use, may be positioned on bed plate 12 above mover base frame rear 138 to allow the user to push the patient in mover base 74 from behind like a wheelchair. In one or more versions, a back rests bottom 33 of back rest 26 may include foldable handles

184 that may fold and lock into place along a long axis of a combined bed plate 12 and mover base 74 to allow the caregiver to easily move the patient from one location to another.

In one or more versions, system 10 may be used in a method of transferring a patient from bed 11, said method including performance of any of the following steps in any suitable order: a) providing system 10 wherein bed plate 12 may be on bed 11 in the co-planar configuration; b) removably inserting transfer arms 72 into transfer arm receptacles 58; c) using tilt arm 73 to tilt back rest 26 relative to seat rest 36 to move bed plate 12 to the seated configuration; d) moving bed plate 12 off bed 11 by moving lift 64 laterally away from bed 11 and/or transfer arms 72 vertically); e) placing seat rest 36 over mover base 74 so that post(s) 90 may be aligned with post receptacle(s) 62; f) using main piston 70 to lower upper section 68 so that post(s) 90 may be received in post receptacles 62 and bed plate 12 may be removably attached to and supported by mover base 74; and/or g) removing transfer arm(s) 72 from transfer arm receptacle(s) 58.

Figure 18:
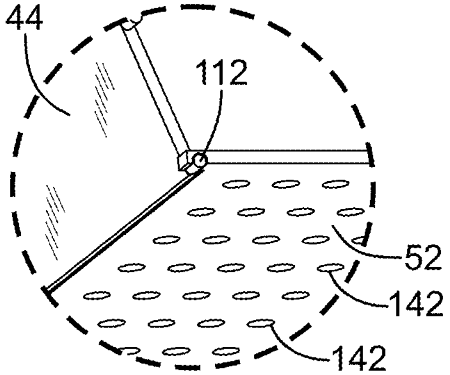
FIG. 18 illustrates a close-up perspective view of the circled area labelled 18 in FIG. 13.
Figure 19:
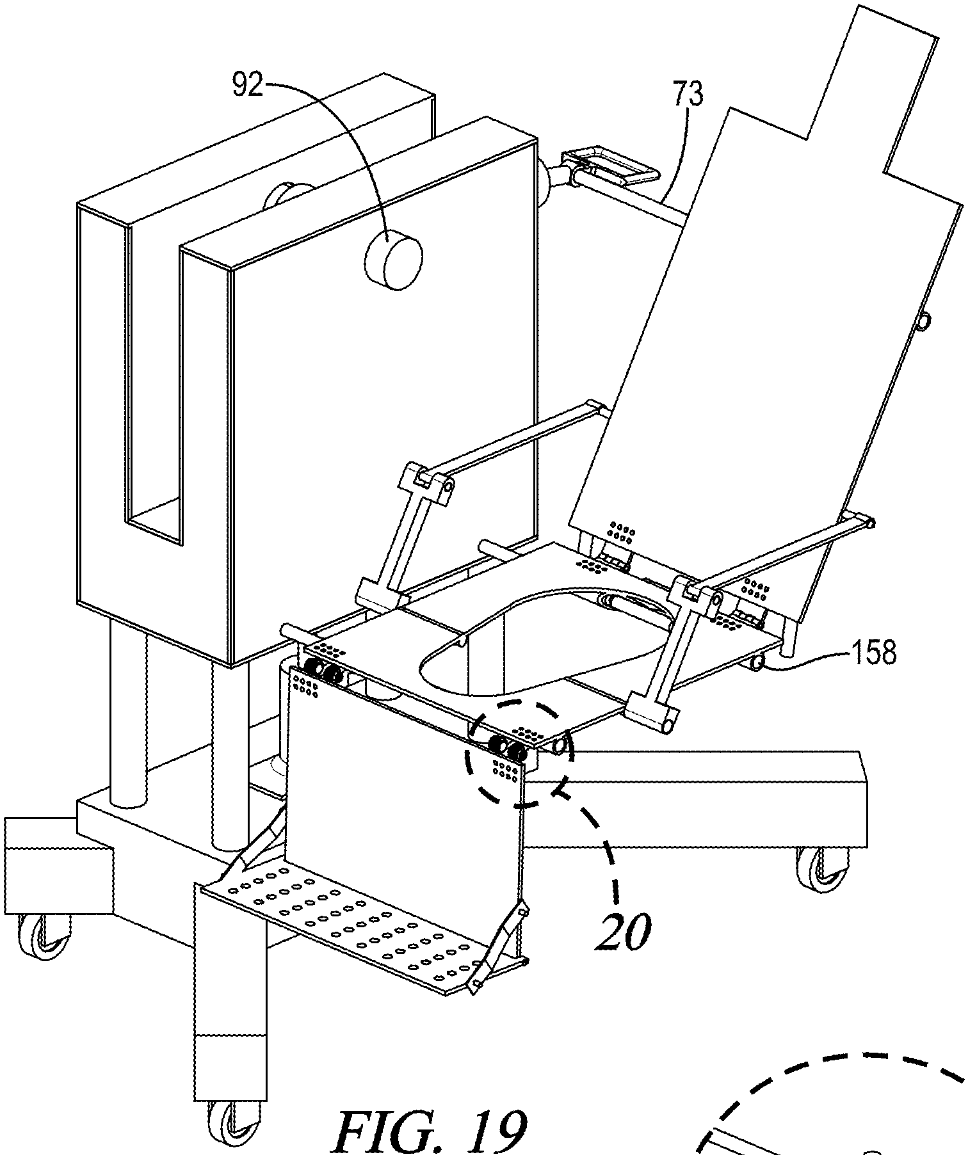
FIG. 19 illustrates a front perspective view of a lift and bed plate of another version of the present invention.
Figure 20:
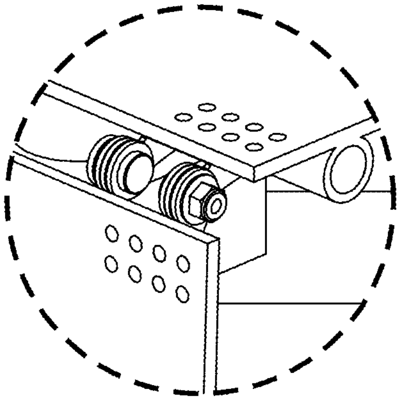
FIG. 20 illustrates a close-up perspective view of the circled area labelled 20 in FIG. 19.

In one or more versions, as best seen in FIG. 18, the foot rest 52 may include holes/perforations 142 extending through foot rest 52. In one or more versions, bed plate 12 may be made from aluminum and/or punched with holes to reduce the weight. In one or more versions, bed plate 12 may also include cushions for patient comfort and safety. In one or more versions, back rest 26 and/or leg rest 43 may include cut-outs into which cushions may be positioned, wherein such cushions may be permanent or removable. In one or more versions, a removable cushion may be placed in toileting aperture 42 when the patient may not be using the restroom. In one or more versions, bed plate 12 may also include straps 174 and associated buckles or other fasteners for patient comfort and safety. In one or more versions, straps 174 may also include padding to reduce pinch points. In one or more versions, bed plate 12 may also include wrist straps 174 and head straps 174 to prevent unwanted movement.

In one or more version, bed plate 12 or lift 64 or mover base 74 may also include a weight sensor/scale to weigh the patient to record patient weight on a daily or bi-daily basis or after toileting for example.

The versions of system 10 described above may be preferably configured to operate within a fixed range for center of gravity without any random motion on the x, y, and z planes. Accordingly, random movements such as "swing" may be eliminated from the patient transfer process, enabling seamless transfer of patient from bed to toilet to shower and reverse within a secure, stable system.

The versions of system 10 described above may provide a single, integrated system for transfers from bed to toilet, shower, and in reverse. Through the integrated design of lift 64, bed plate 12 and mover base 74, bed plate 12 and mover base 74 may seamlessly "transform" into a fully functional toilet and shower accessible wheelchair, eliminating the need for a separate shower chair or wheelchair to complete the transfer process. The versions of system 10 described above may replace a normal wheelchair, a shower wheel chair, and a HOYER LIFT, and optionally a separate scale in versions of system 10 that include a weight sensor/scale as noted above.

The versions of system 10 described above may also include one or more fail safes that prevent operation of system 10 until all components are in place. Such fail safes could include, for example, a sensor that only turns on the motor of lift 64 when arms 72 and 73 are locked into receptacles 58 and 60.

Figure 40:
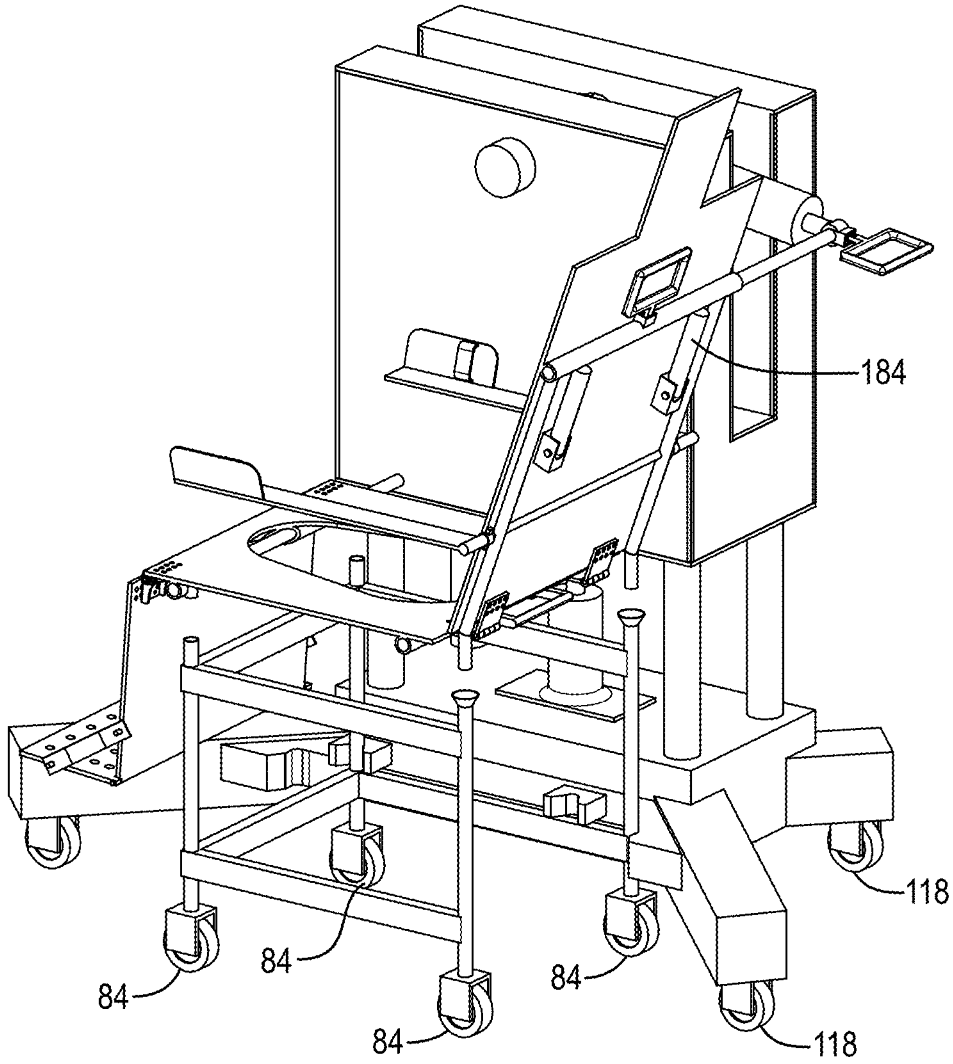
FIG. 40 illustrates a perspective view of a lift, mover base and bed plate of a version of the present invention.

In one or more versions, some, or all of wheels 84 and 118 may include wheel locks to prevent unwanted movement. In one or more versions, said wheel locks may be engaged or disengaged using a lever. In one or more versions, lift wheels 118 and mover base frame wheels 84 are approximately the same diameter, as shown in FIG. 40 for example.

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the examples below. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An integrated patient lift and transfer system comprising: a bed plate configured to rest on a bed and comprising a seat rest and a back rest pivotably attached to the seat rest, the bed plate configurable to a planar configuration in which the back rest and seat rest are co-planar and to a seated configuration in which the back rest and seat rest are not co-planar; a mover base comprising one or more wheels and configured to removably attach to the bed plate; and a lift comprising one or more transfer arms and one or more tilt arms, wherein the one or more transfer arms and one or more tilt arms are configured to removably attach to the bed plate and tilt the bed plate from the planar configuration to the seated configuration and to transfer the bed plate from the bed to the mover base.

Example 2

The integrated patient lift and transfer system of Example 1, wherein the bed plate further includes a toileting aperture extending through the seat rest, a leg rest located distal to and pivotably connected to the seat rest, a foot rest located distal to and pivotably connected to the leg rest, and first and second arm rests.

Example 3

The integrated patient lift and transfer system of Example 2, wherein the back rest is angled at an angle between about 30-degrees and about 90-degrees from the seat rest while the bed plate is in the seated configuration and wherein the foot rest is angled at an angle of between about 30-degrees and about 90-degrees from the leg rest while the bed plate is in the seated configuration.

Example 4

The integrated patient lift and transfer system of Example 1, wherein the bed plate further includes one or more transfer arm receptacles, wherein each transfer arm receptable of the one or more transfer arm receptacles are configured to receive one of the one or more transfer arms of the lift.

Example 5

The integrated patient lift and transfer system of Example 4, further comprising a proximity sensor and an indication system, wherein the proximity sensor senses when each of the one or more transfer arms are received within one of the one or more transfer arm receptacles and the indication system provides an indication.

Example 6

The integrated patient lift and transfer system of Example 1, wherein the lift further includes a base including one or more wheels, a lift upper section including the one or more transfer arms and the one or more tilt arms, and a main piston connecting the base to the upper section.

Example 7

The integrated patient lift and transfer system of Example 6, wherein the main piston is configured to raise and lower the lift upper section relative to the base.

Example 8

The integrated patient lift and transfer system of Example 7, wherein the main piston is moved by a motor and wherein the motor is powered by a battery.

Example 9

The integrated patient lift and transfer system of Example 1, wherein the bed plate includes one or more tilt arm receptacles, wherein the one or more tilt arms of the lift are operatively connected to a pivot arm, and wherein each tilt arm receptacle of the one or more tilt arm receptacles are configured to receive one of the one or more tilt arms.

Example 10

The integrated patient lift and transfer system of Example 9, wherein the pivot arm is configured to engage the one or more tilt arms to tilt the back rest relative to the seat rest to place the bed plate in the seated configuration.

Example 11

The integrated patient lift and transfer system of Example 10, wherein the pivot arm is moved by a motor and wherein the motor is powered by a battery.

Example 12

The integrated patient lift and transfer system of Example 9, further comprising a proximity sensor and an indication system, wherein the proximity sensor senses when each of the one or more tilt arms are received within one of the one or more tilt arm receptacles and the indication system provides an indication.

Example 13

The integrated patient lift and transfer system of Example 1, wherein the bed plate includes one or more posts, wherein the mover base includes a frame including the one or more wheels and one or more post receptacles, and wherein each post of the one or more posts are configured to be removably received in one of the one or more post receptacles when the bed plate is transferred from the bed to the mover base.

Example 14

A method of lifting and transferring a patient out of a bed, the method comprising: placing a bed plate having a between the patient and the bed such that the patient is positioned on the bed plate while the bed plate is in a planar configuration; providing a lift, the lift comprising: one or more transfer arms, and one or more tilt arms; attaching the one or more transfer arms and the one or more tilt arms to the bed plate; utilizing the lift to remove the bed plate and patient from the bed; utilizing the one or more transfer arms and the one or more tilt arms to tilt the bed plate from the planar configuration to a seated configuration; and placing the bed plate in the seated configuration onto a mover base such that the patient has been lifted and transferred out of the bed.

Example 15

The method of Example 14, further comprising the step of providing the bed plate, wherein the bed plate includes a seat rest, a back rest pivotably attached to the seat rest, one or more transfer arm receptacles, and one or more tilt arm receptacles; wherein each transfer arm receptable of the one or more transfer arm receptacles are configured to receive one of the one or more transfer arms of the lift, and wherein each tilt arm receptacle of the one or more tilt arm receptacles are configured to receive one of the one or more tilt arms.

Example 16

The method of Example 15, wherein the one or more tilt arms are operatively connected to a pivot arm and wherein the pivot arm is configured to engage the one or more tilt arms to tilt the back rest relative to the seat rest to place the bed plate in the seated configuration.

Example 17

The method of Example 16, wherein the pivot arm is moved by a motor and wherein the motor is powered by a battery.

Example 18

The method of Example 14, wherein the lift further includes a base including one or more wheels, a lift upper section including the one or more transfer arms and the one or more tilt arms, and a main piston connecting the base to the upper section; and wherein the main piston is configured to raise and lower the lift upper section relative to the base.

Example 19

The method of Example 18, wherein the main piston is moved by a motor and wherein the motor is powered by a battery.

Example 20

The method of Example 14, wherein the bed plate includes one or more posts, wherein the mover base includes a frame including the one or more wheels and one or more post receptacles, and wherein each post of the one or more posts are configured to be removably received in one of the one or more post receptacles when the bed plate is transferred from the bed to the mover base.

It should be understood that any of the versions of the system described herein may include various other features in addition to or in lieu of those described above. By way of example only, any of the versions of the system described herein may also include one or more of the various features disclosed in any of the various references that are incorporated by reference herein. It should also be understood that the teachings herein may be readily applied to any version of the system described in any of the other references cited herein, such that the teachings herein may be readily combined with the teachings of any of the references cited herein in numerous ways.

It should also be understood that any ranges of values referred to herein should be read to include the upper and lower boundaries of such ranges. For instance, a range expressed as ranging “between approximately 1.0 inches and approximately 1.5 inches” should be read to include approximately 1.0 inches and approximately 1.5 inches, in addition to including the values between those upper and lower boundaries.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein may only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several such potential modifications have been mentioned, and others may be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An integrated patient lift and transfer system comprising:

a bed plate configured to rest on a bed and comprising a seat rest, a back rest pivotably attached to the seat rest, the bed plate configurable to a planar configuration in which the back rest and seat rest are co-planar and to a seated configuration in which the back rest and seat rest are not co-planar;

a mover base comprising one or more wheels and configured to removably attach to the bed plate; and a lift comprising one or more transfer arms and one or more tilt arms operatively connected to a pivot arm, wherein the one or more transfer arms and one or more tilt arms are configured to removably attach to the bed plate and tilt the bed plate from the planar configuration to the seated configuration and to transfer the bed plate from the bed to the mover base, and wherein the pivot arm is configured to movably engage the one or more tilt arms to tilt the back rest relative to the seat rest to place the bed plate in the seated configuration.

2. The integrated patient lift and transfer system of claim 1, wherein the bed plate further includes a toileting aperture extending through the seat rest, a leg rest located distal to and pivotably connected to the seat rest, a foot rest located distal to and pivotably connected to the leg rest, and first and second arm rests.

3. The integrated patient lift and transfer system of claim 2, wherein the back rest is angled at an angle between 30-degrees and 90-degrees from the seat rest while the bed plate is in the seated configuration and wherein the foot rest is angled at an angle of between 30-degrees and 90-degrees from the leg rest while the bed plate is in the seated configuration.

4. The integrated patient lift and transfer system of claim 1, wherein the bed plate further includes one or more transfer arm receptacles, wherein each transfer arm receptable of the one or more transfer arm receptacles are configured to receive one of the one or more transfer arms of the lift.

5. The integrated patient lift and transfer system of claim 4, further comprising a proximity sensor and an indication system, wherein the proximity sensor senses when each of the one or more transfer arms are received within one of the one or more transfer arm receptacles and the indication system provides an indication.

6. The integrated patient lift and transfer system of claim 1, wherein the lift further includes a base including one or more wheels, a lift upper section including the one or more transfer arms and the one or more tilt arms, and a main piston connecting the base to the upper section.

7. The integrated patient lift and transfer system of claim 6, wherein the main piston is configured to raise and lower the lift upper section relative to the base.

8. The integrated patient lift and transfer system of claim 7, wherein the main piston is moved by a motor and wherein the motor is powered by a battery.

9. The integrated patient lift and transfer system of claim 1, wherein the bed plate includes one or more tilt arm receptacles, and wherein each tilt arm receptacle of the one or more tilt arm receptacles are configured to receive one of the one or more tilt arms.

10. The integrated patient lift and transfer system of claim 9, further comprising a proximity sensor and an indication system, wherein the proximity sensor senses when each of the one or more tilt arms are received within one of the one or more tilt arm receptacles and the indication system provides an indication.

11. The integrated patient lift and transfer system of claim 1, wherein the pivot arm is moved by a motor and wherein the motor is powered by a battery.

12. The integrated patient lift and transfer system of claim 1, wherein the bed plate includes one or more posts, wherein the mover base includes a frame including one or more wheels and one or more post receptacles, and wherein each post of the one or more posts are configured to be removably received in one of the one or more post receptacles when the bed plate is transferred from the bed to the mover base.

13. A method of lifting and transferring a patient out of a bed, the method comprising:

placing a bed plate having a seat rest and a back rest pivotably attached to the seat rest between the patient and the bed such that the patient is positioned on the bed plate while the bed plate is in a planar configuration;

providing a lift, the lift comprising:

one or more transfer arms, and one or more tilt arms operatively connected to a pivot arm;

attaching the one or more transfer arms and the one or more tilt arms to the bed plate;

utilizing the lift to remove the bed plate and patient from the bed;

utilizing the one or more transfer arms and the one or more tilt arms to tilt the bed plate from the planar configuration to a seated configuration, wherein the pivot arm is configured to movably engage the one or more tilt arms to tilt the back rest relative to the seat rest to place the bed in the seated configuration; and placing the bed plate in the seated configuration onto a mover base such that the patient has been lifted and transferred out of the bed.

14. The method of claim 13, further comprising the step of providing the bed plate, wherein the bed plate further includes one or more transfer arm receptacles and one or more tilt arm receptacles; wherein each transfer arm receptable of the one or more transfer arm receptacles are configured to receive one of the one or more transfer arms of the lift, and wherein each tilt arm receptacle of the one or more tilt arm receptacles are configured to receive one of the one or more tilt arms.

15. The method of claim 13, wherein the pivot arm is moved by a motor and wherein the motor is powered by a battery.

16. The method of claim 13, wherein the lift further includes a base including one or more wheels, a lift upper section including the one or more transfer arms and the one or more tilt arms, and a main piston connecting the base to the upper section; and wherein the main piston is configured to raise and lower the lift upper section relative to the base.

17. The method of claim 16, wherein the main piston is moved by a motor and wherein the motor is powered by a battery.

18. The method of claim 13, wherein the bed plate includes one or more posts, wherein the mover base includes a frame including one or more wheels and one or more post receptacles, and wherein each post of the one or more posts are configured to be removably received in one of the one or more post receptacles when the bed plate is transferred from the bed to the mover base.

* * * * *